US008219305B2

(12) United States Patent
Iwata et al.

(10) Patent No.: US 8,219,305 B2
(45) Date of Patent: *Jul. 10, 2012

(54) ENGINE WITH AN AUTOMATIC CHOKE AND METHOD OF OPERATING AN AUTOMATIC CHOKE FOR AN ENGINE

(75) Inventors: Hisaya Iwata, Brookfield, WI (US); Robert Koenen, Pewaukee, WI (US); Andrew Perez, Brookfield, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 446 days.

This patent is subject to a terminal disclaimer.

(21) Appl. No.: 12/466,593

(22) Filed: May 15, 2009

(65) Prior Publication Data

US 2009/0299614 A1 Dec. 3, 2009

Related U.S. Application Data

(60) Provisional application No. 61/059,503, filed on Jun. 6, 2008, provisional application No. 61/056,230, filed on May 27, 2008, provisional application No. 61/056,223, filed on May 27, 2008.

(51) Int. Cl.
*G06F 19/00* (2011.01)

(52) U.S. Cl. .......................................................... 701/113

(58) Field of Classification Search ............... 123/179.1, 123/179.5, 179.13, 179.15, 179.18, 179.19; 701/113

See application file for complete search history.

(56) References Cited

U.S. PATENT DOCUMENTS 3,064,953 A 11/1952 Hayes
2,684,057 A 7/1954 Bolton
2,689,532 A 9/1954 Orshansky, Jr.
2,764,393 A 9/1956 Geyer
3,618,581 A 11/1971 Simonet
3,721,428 A 3/1973 Gele et al.
3,780,718 A 12/1973 Nambu et al.
3,837,322 A 9/1974 Shishido et al.
3,948,240 A 4/1976 Hirosawa et al.
4,005,690 A 2/1977 Hirosawa et al.
4,011,844 A 3/1977 Hirosawa et al.
4,027,640 A 6/1977 Hirosawa et al.
4,052,488 A 10/1977 Schoeman (Continued)

FOREIGN PATENT DOCUMENTS

JP 57051936 A 3/1982

(Continued)

*Primary Examiner* — John Kwon

(74) *Attorney, Agent, or Firm* — Michael Best & Friedrich LLP

(57) ABSTRACT

An automatic choke connectable to an engine. Also disclosed is an engine including the automatic choke, an apparatus including the engine and the automatic choke, and a method of controlling a choke valve. The automatic choke includes a motor for moving a choke valve and a controller electrically connected to the motor. In one construction, the controller is configured to store position information and a flag related to a position of the choke valve, determine the engine has, and control the automatic choke with the stored position information based on the flag and the determination that the engine has re-started. In another construction, the controller is configured to generate a motor control signal to direct the choke valve to a fully-open position without providing choke relief based on a temperature value indicating the engine temperature is greater than a threshold.

9 Claims, 16 Drawing Sheets

U.S. PATENT DOCUMENTS 4,094,933 A 6/1978 Schoeman
4,144,861 A 3/1979 Yamashita et al.
4,197,767 A 4/1980 Leung
4,245,317 A 1/1981 Marchak
4,246,639 A 1/1981 Carp et al.
4,279,841 A 7/1981 Stettner
4,290,107 A 9/1981 Suda et al.
4,298,549 A 11/1981 Woodworth
4,321,902 A 3/1982 Stoltman
4,344,898 A 8/1982 Takada et al.
4,375,797 A 3/1983 Otsuka et al.
4,380,985 A 4/1983 Otsuka et al.
4,383,409 A 5/1983 Otsuka et al.
4,385,602 A 5/1983 Itou et al.
4,388,904 A 6/1983 Masaki
4,391,249 A 7/1983 Bianchi et al.
4,399,792 A 8/1983 Otsuka et al.
4,433,665 A 2/1984 Abe et al.
4,449,502 A 5/1984 Furuhashi
4,463,723 A 8/1984 Tansuwan
4,475,502 A 10/1984 Matsumoto
4,524,742 A 6/1985 Bonfiglioli et al.
4,527,527 A 7/1985 Irino et al.
4,530,805 A 7/1985 Abbey
4,557,242 A * 12/1985 Hasegawa ..................... 123/681
4,563,990 A 1/1986 Kishida et al.
4,644,919 A 2/1987 Inoguchi et al.
4,660,533 A * 4/1987 Watabe et al. ................ 123/681
4,662,333 A 5/1987 Martel
4,730,589 A 3/1988 Ohtaki et al.
4,753,209 A 6/1988 Hibino et al.
4,768,478 A 9/1988 Martel
4,788,014 A 11/1988 Kanno
4,883,616 A 11/1989 Covey, Jr.
4,987,871 A 1/1991 Nishikawa
5,014,673 A 5/1991 Fujimoto et al.
5,031,593 A 7/1991 Erhard et al.
5,146,882 A 9/1992 Brinkman et al.
5,408,981 A 4/1995 Tomisawa
5,537,964 A 7/1996 Hoshiba
5,611,312 A 3/1997 Swanson et al.
5,657,730 A 8/1997 Gustavsson
5,660,765 A 8/1997 King et al.
5,827,455 A 10/1998 Nakai
6,012,420 A 1/2000 Dykstra et al.
6,145,487 A 11/2000 Dykstra et al.
6,880,812 B2 4/2005 Nonaka
6,932,058 B2 8/2005 Nickel et al.
7,117,834 B2 10/2006 Kamimura et al.
7,118,097 B2 10/2006 Moriyama et al.
7,156,376 B2 1/2007 Bungo et al.
7,171,947 B2 2/2007 Fukushima et al.
7,204,232 B2 4/2007 Matsuda
7,213,555 B2 5/2007 Kamimura et al.
7,246,591 B2 7/2007 Shinogi et al.
7,284,522 B2 10/2007 Kamimura et al.
7,331,326 B2 2/2008 Arai et al.
7,344,125 B2 3/2008 Matsuda et al.
7,487,608 B2 * 2/2009 Yamazaki et al. .............. 37/245
2004/0206326 A1 10/2004 North
2005/0098907 A1 5/2005 Richard et al.
2005/0200030 A1 9/2005 Kamimura et al.
2006/0037574 A1 2/2006 Matsuda et al.
2007/0131200 A1 6/2007 Matsuda et al.

FOREIGN PATENT DOCUMENTS

JP 60011640 A 1/1985
JP 62279259 12/1987
JP 63189661 8/1988
JP 2086969 A 3/1990
JP 4116256 A 4/1992
JP 10030499 A 2/1998
JP 2004232529 A 8/2004
JP 2006057499 A 3/2006

* cited by examiner

ENGINE WITH AN AUTOMATIC CHOKE AND METHOD OF OPERATING AN AUTOMATIC CHOKE FOR AN ENGINE

RELATED APPLICATIONS

This application claims the benefit of U.S. Patent Application No. 61/059,503 filed Jun. 6, 2008; 61/056,230 filed May 27, 2008; and 61/056,223 filed May 27, 2008, all of which are incorporated herein by reference.

BACKGROUND

The invention relates to an automatic choke for an engine, particularly a small engine. The invention also relates to a method of operating the automatic choke.

Small engines having a carburetor are used in various apparatus, including lawn and garden equipment (e.g., lawn mowers, lawn tractors, blowers), generators, pressure washers, snow throwers, agricultural equipment, outboard engines and other outdoor power equipment. The carburetor can include a throttle and a choke. The choke provides a rich fuel-air mixture upon start-up of the engine to sustain the combustion reaction, and the throttle valve position is responsive to the load on the engine.

In many small engines, the choke is actuated manually. However, some small engines include an automatic choke. For example, it is known to control a choke valve with a thermally responsive mechanism.

SUMMARY

In one embodiment, the automatic choke of the invention controls the choke valve during one or more relief periods, or phases, any of which can be based on an engine temperature. For example, the automatic choke can operate in three relief phases. The first relief phase maintains the choke valve at a first position for a first time period. The second relief phase maintains the choke valve at a second position for a number or count of engine revolutions. The third relief phase transitions the choke valve from the second position to the fully open position over a second time period. The first and second positions can be the same, and/or can be based on a single engine temperature or based on distinct engine temperatures. Further, the first and second time periods and the revolution count can be based on a single (or the same) engine temperature or can be based on distinct (or different) engine temperatures.

In another embodiment, the invention provides an automatic choke for an engine having a choke valve. The automatic choke includes a motor configured to be connected to the choke valve, a temperature sensor configured to be connected to the engine, and a controller electrically connected to the motor and the temperature sensor. The controller can also be electrically connected to an ignition circuit of the engine. The controller includes an electronic circuit such as a programmable device. In one construction, the controller is configured to generate a motor control signal to move the choke valve to a first position, determine a time period to hold the choke valve at the first position, generate the motor control signal to move the choke valve from the first position to the second position, determine a count to hold the choke valve at the second position, and generate the motor control signal to move the choke valve to a fully-open position.

In another construction, the controller is configured to store position information related to the first position, store a flag associated with the first position, determine the engine has re-started, and control the automatic choke with the stored position information based on the flag and the determination that the engine has re-started. In yet another construction, the controller can be configured to determine the engine is being restarted, determine a temperature value based on the temperature signal after the determination that the engine is being restarted, and direct the choke valve to a fully-open position without providing choke relief based on the temperature value indicating the engine temperature is greater than a threshold.

In another embodiment, the invention provides an engine and an apparatus with the automatic choke.

Other aspects of the invention will become apparent by consideration of the detailed description and accompanying drawings.

DETAILED DESCRIPTION

Figure 1:
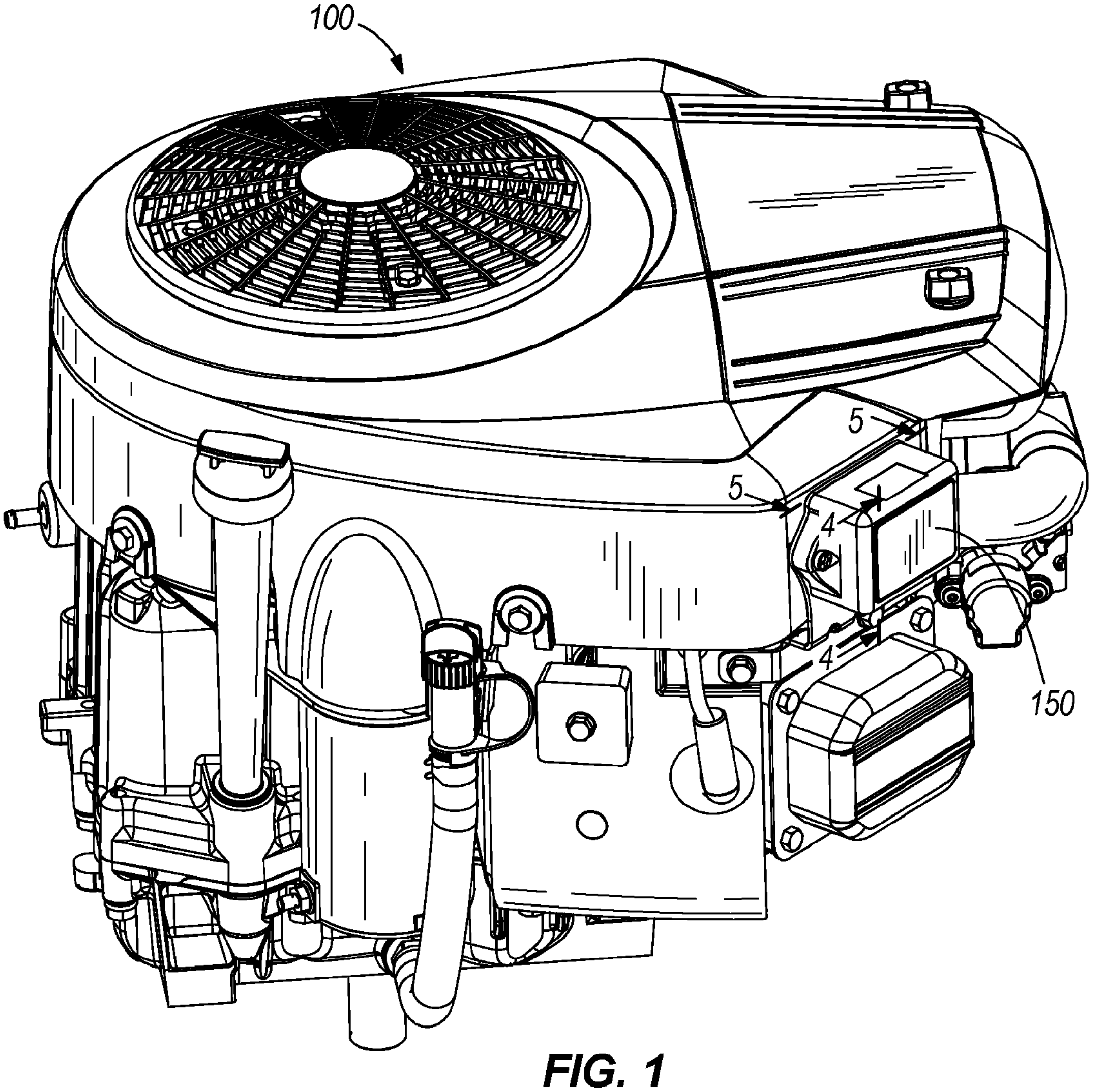
FIG. 1 is a perspective view of a small engine having an automatic choke.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Although directional references, such as upper, lower, downward, upward, rearward, bottom, front, rear, etc., may be made herein in describing the drawings, these references are made relative to the drawings (as normally viewed) for convenience. These directions are not intended to be taken literally or limit the invention in any form. In addition, terms such as “first”, “second”, and “third” may be used herein for purposes of description and are not intended to indicate or imply relative importance or significance. Similarly, the use of capitalization used herein is for the purpose of description and is not intended to indicate or imply any importance or significance.

It should be understood that embodiments of the invention include hardware and software components or modules that, for purposes of discussion, may be illustrated and described as if the majority of the components were implemented in hardware. However, one of ordinary skill in the art, and based on a reading of this detailed description, would recognize that, in at least one embodiment, the hardware based aspects of the invention, including the electronics, may be implemented in software. As such, it should be noted that a plurality of hardware and software based devices, as well as a plurality of different structural components, may be utilized to implement the invention. Furthermore, and as described in subsequent paragraphs, the specific mechanical configurations illustrated in the drawings are intended to exemplify embodiments of the invention and that other alternative mechanical constructions are possible.

Figure 2:
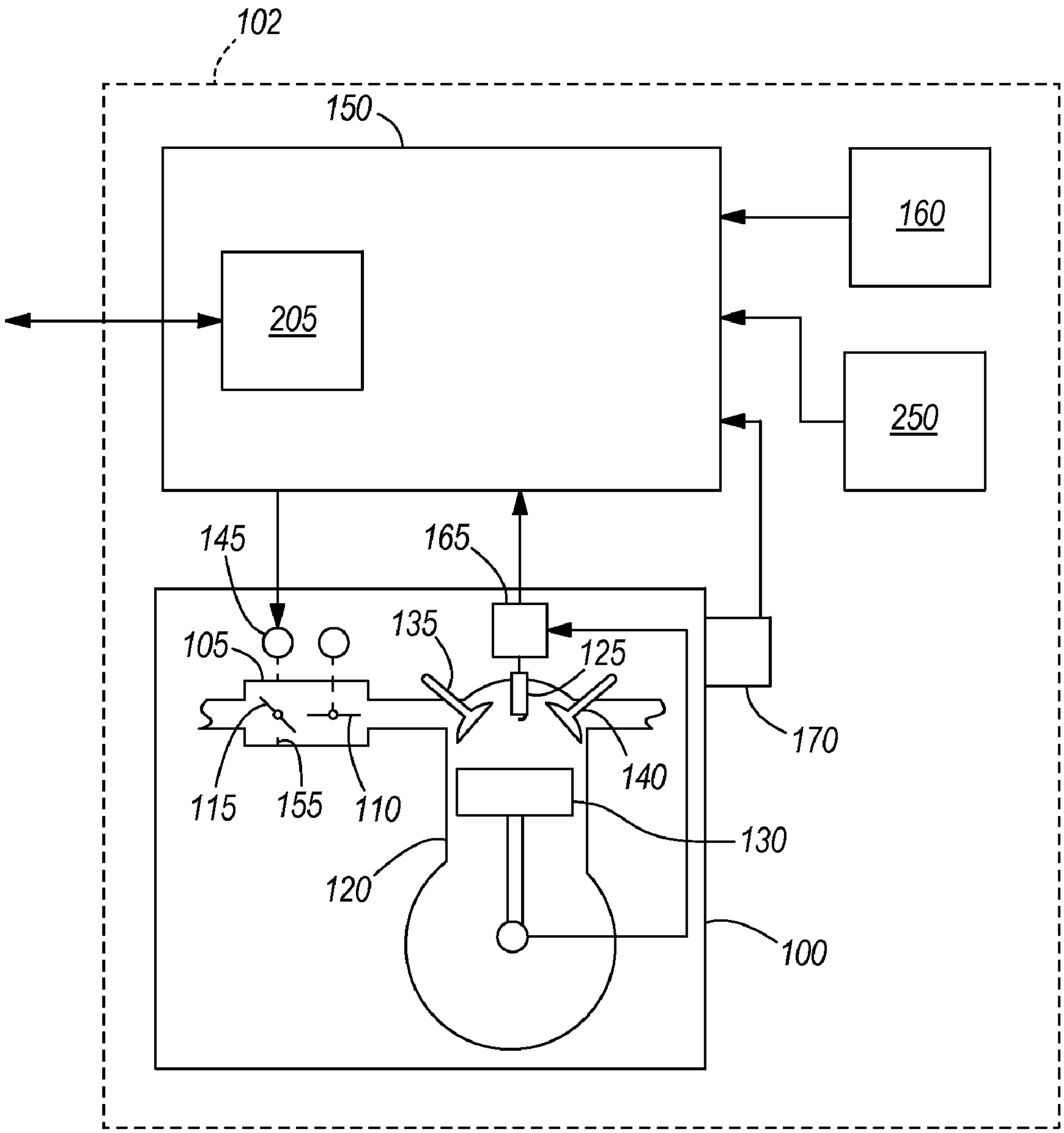
FIG. 2 is a schematic representation of an apparatus including the engine of FIG. 1.

FIG. 1 depicts a small engine 100 (e.g., less than about 45 horsepower) incorporating one embodiment of the invention. FIG. 2 represents a portion of an apparatus 102 (e.g., a piece of outdoor power equipment) including the small engine 100 having a carburetor 105. It is envisioned, however, that the invention can be used with larger engines having a carburetor.

The carburetor 105 includes a throttle valve 110 and a choke valve 115 upstream from a cylinder 120. The cylinder 120 includes an ignition plug 125, a piston 130, an intake valve 135, and an exhaust valve 140. The carburetor 105 mixes air with fuel. The mixture is introduced to the cylinder head past the intake valve 135. The piston 130 compresses the mixture and the ignition plug 125 adds a spark to the compressed mixture. The resulting combustion byproducts are then exhausted past the exhaust valve 140.

The choke valve 115 is driven by a motor such as a unipolar stepper motor 145. Other types of motors, including a bi-polar stepper motor or a linear motor, can be used to move the choke valve 115. The motor 145 is electrically coupled to a controller 150. As discussed below, the controller 150 receives inputs from one or more sensors and controls one or more aspects of the engine, including the motor 145, based on the inputs from the sensors. Therefore, the automatic choke may include the choke valve 115, the motor 145, the controller 150, and the sensors. It is also envisioned that the automatic choke can include a mechanical stop 155, which will be discussed further below.

Referring further to FIG. 2, the controller 150 is coupled to a power source 160, an ignition circuit 165, and a temperature sensor 170. The power source 160 provides supply power to the electrical components of the engine 100, including the controller 150. For example, the power source can be a standard 12 VDC battery.

A small engine 100 typically includes an ignition circuit 165 for controlling the ignition or sparking of the engine 100. The controller 150 also uses a signal produced by the ignition circuit 165 or by a separate sensor as an indication of the engine rotational speed. The controller 150 may also use both the signal produced by the ignition circuit 165 and the signal by the separate sensor to determine the engine rotational speed. For example, the rotational speed may be determined by comparing the ignition signal with the sensory output signal. That is, the rotational speed of the power takeoff shaft of the engine 100 has a relation to the ignition of the engine 100. The controller 150 uses the ignition circuit or the separate revolution sensor to also obtain the engine rotational speed. Other means can also be used to determine the rotational speed of the engine 100. For example, it is contemplated that the engine rotational speed can be calculated by a moving average of one or more signals. Additionally, the controller 150 can provide a deactivate (or kill) signal to the ignition circuit 165 to prevent sparking.

The temperature sensor 170 senses a temperature of the engine 100 and provides a signal having a relation to the sensed temperature to the controller 150. An exemplary temperature sensor 170 is a Hokuriku model number NM3103H400H3 thermistor. Other temperature sensors can be used in place of the temperature sensor 170 shown in FIG. 2.

Figure 3:
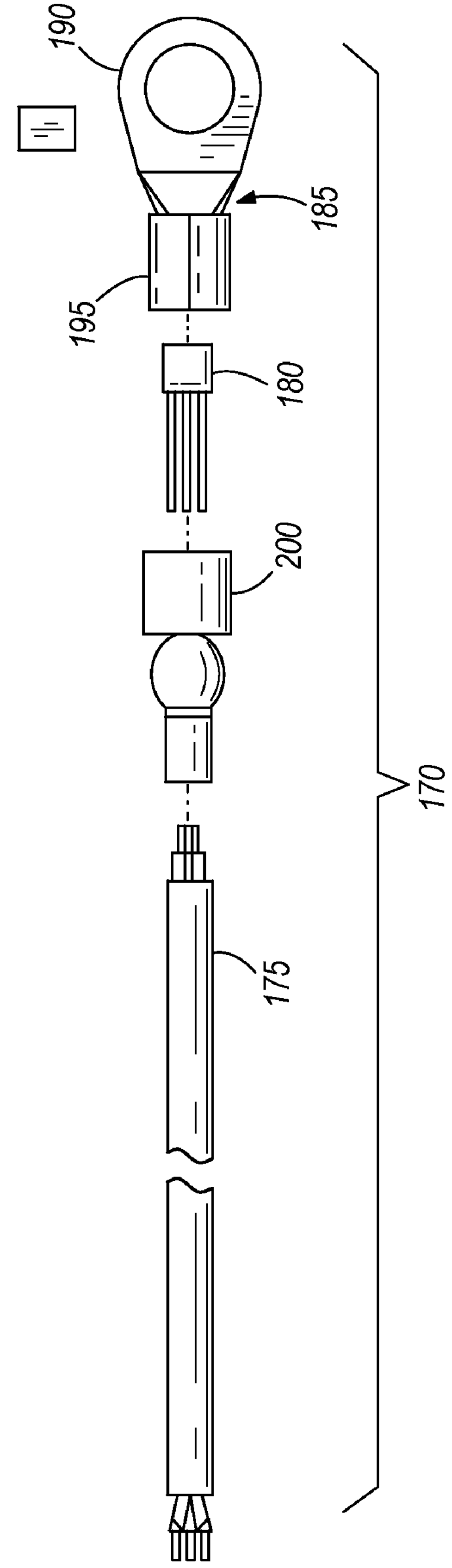
FIG. 3 is an exploded view of a temperature sensor capable of being used in the automatic choke of FIG. 1.

For example, an alternative temperature sensor 170A is shown in FIG. 3. The temperature sensor 170A includes a conductor 175 coupled to a thermal sensor 180. In one construction, the thermal sensor 180 is a silicone thermistor, such as a National Semiconductor model no. LN 60-TO92 silicone thermistor. The temperature sensor 170A further includes a connector 185 having a first connector or ring portion 190 and a second connector portion 195. The thermal sensor 180 is at least partially housed in at least a portion of the second connector portion 195 such that the thermal sensor 180 engages the second connector portion 195. A fastener, such as potting epoxy, is then used to fasten the thermal sensor 180 to the connector 185. A shrink-wrapped insulator 200 can also be placed around the conductor 175, thermal sensor 180, and connector 185 for protection from the elements. The ring portion 190 allows the temperature sensor 170 to be coupled to the engine 100 via a fastener, such as a bolt or screw. It is envisioned that the connector 185 can include other shapes or designs in place of the ring portion 190 to promote the coupling of the connector to the engine 100 and the thermal conduction to the thermal sensor 180.

Referring back to FIG. 2, the controller 150 includes an input/output (I/O) layer or circuit 205. The I/O circuit 205 includes I/O connections allowing an electrical system and/or operator to interact with the controller 150. The interaction includes sending information to and/or receiving information from the controller. As used herein, the term “information” is broadly construed to comprise knowledge, instructions, data, codes, values, events, states, measures, outcomes, and similar items, which may be communicated via signals (e.g., analog signals, digital signals) or stored in memory.

Before proceeding further, it should be understood that every connection to/from the controller 150 can be considered an I/O connection. However, unless stated otherwise herein, it is assumed that the I/O circuit 205 allows the controller 150 to interface with an operator (e.g., via an input and/or output device or interface) or an electrical system (e.g., a programming apparatus, a diagnostic apparatus) not normally associated with the operation of the controller 150.

Figure 4:
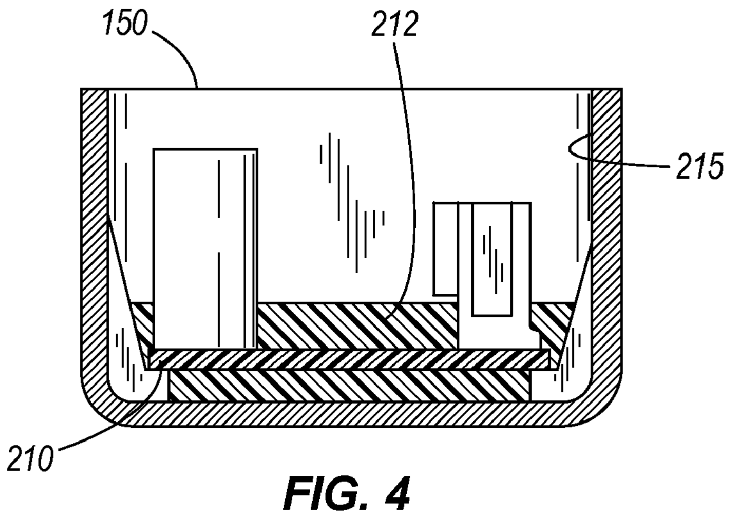
FIG. 4 is sectional view of the controller of the automatic choke of FIG. 1.
Figure 5:
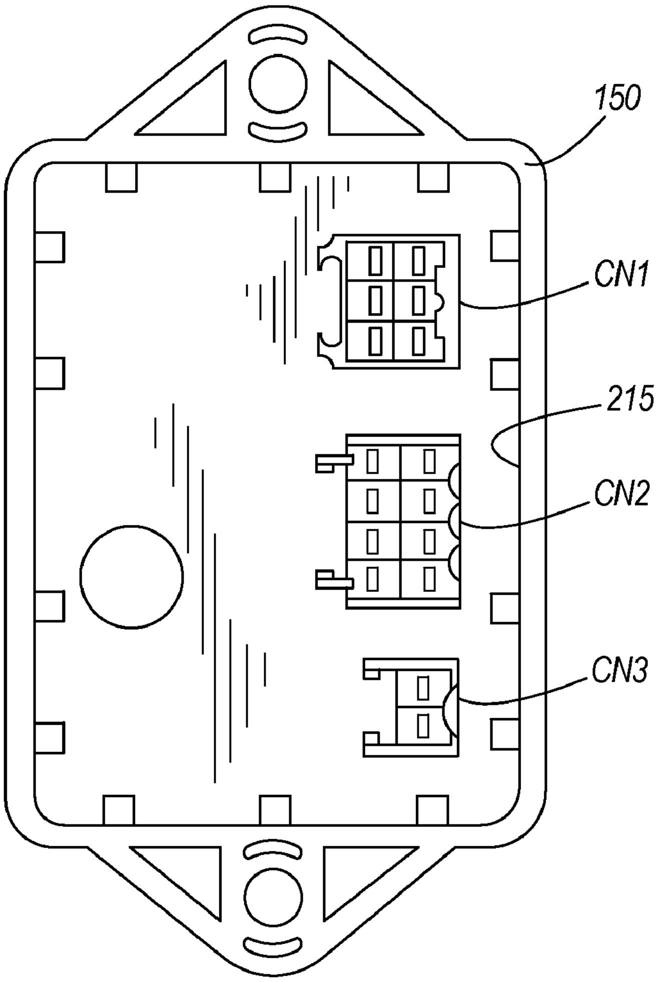
FIG. 5 is a top view of the controller of FIG. 4.

With reference to FIG. 4, the controller 150 is supported by a circuit board 210 surrounded at least partially by a potting material 212 and secured to a housing 215. Ports CN1, CN2, and CN3 (FIG. 5), extend from the housing 215 and receive conductors. The conductors and ports CN1, CN2, and CN3 couple the controller 150 to the stepper motor 145, the power source 160, the ignition circuit 165, the temperature sensor 170, and a second electrical system or can be used by a technician. As shown in FIGS. 4 and 5, the automatic choke 240 can be a stand-alone device that is retrofit onto existing engines 100 by coupling the automatic choke 240 to the engine 100. The retrofit of the automatic choke 240 includes coupling the motor 145 to the choke valve 115 and coupling the temperature sensor 170 to the engine 100.

It is also envisioned that the controller 150 can control other aspects of the engine 100 and/or other aspects of the apparatus 102 driven by the engine 100. For example, the controller 150 can be used to control the throttle valve 110 or an ignition circuit, or to operate an accessory component 250 of the apparatus 102.

Figure 6A:
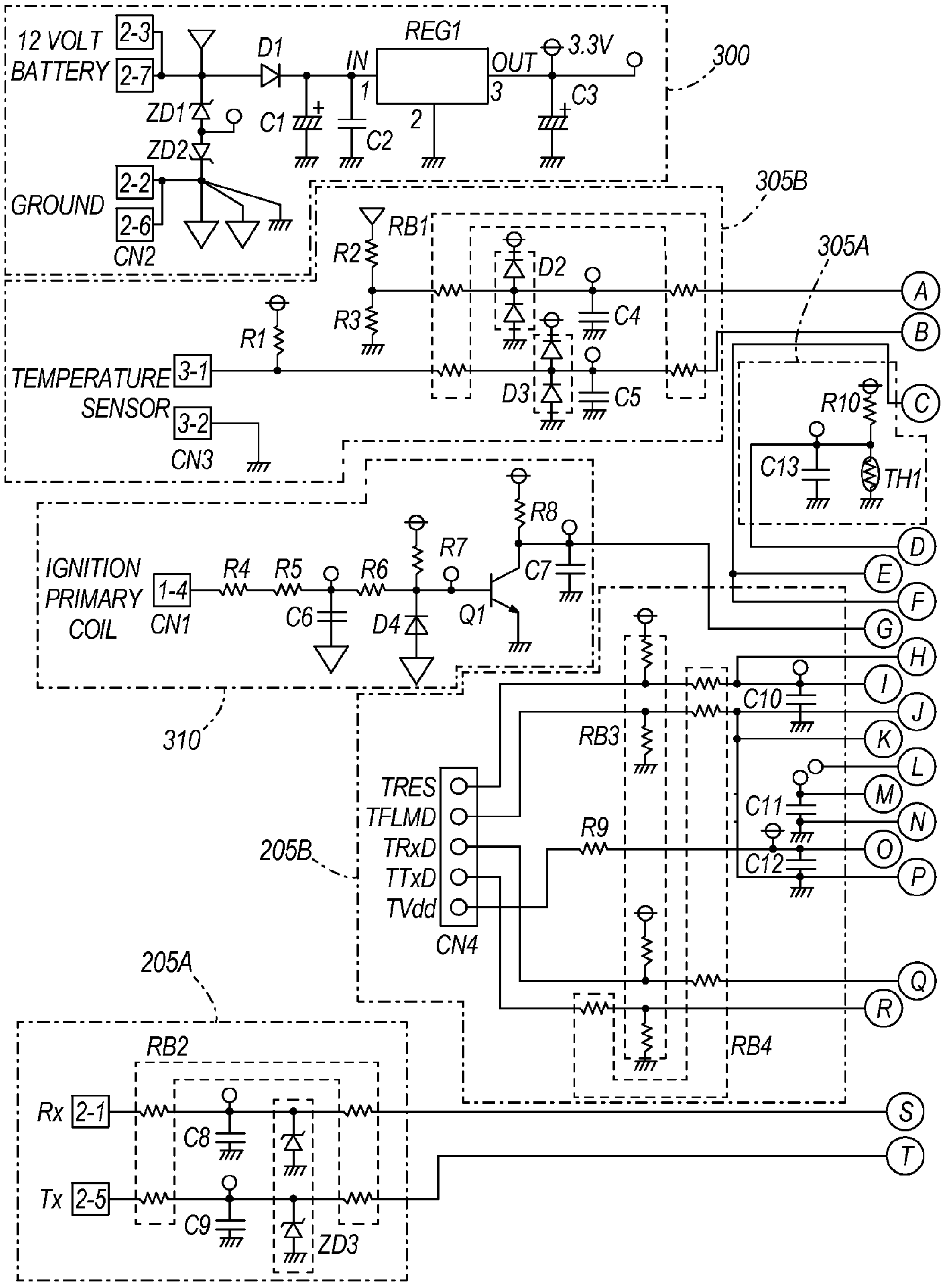
FIGS. 6A and 6B are an electrical schematic of the automatic choke of FIG. 4.
Figure 6B:
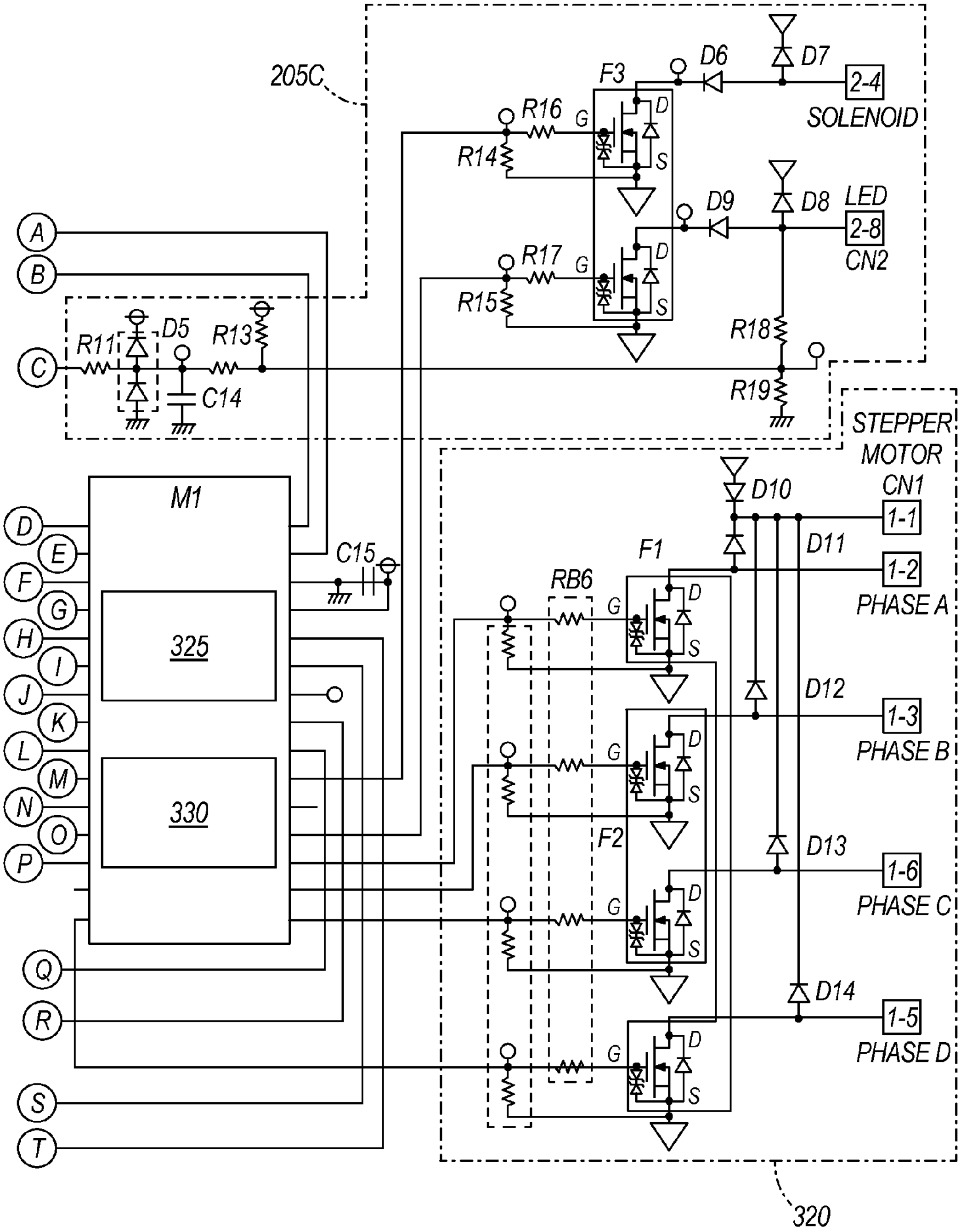

An electrical schematic of the controller 150 is shown in FIGS. 6A and 6B. The controller 150 includes a power supply 300, a temperature signal conditioning circuit 305, a revolution detection circuit 310, a programmable device such as microcontroller M1, a motor drive circuit 320, and I/O circuitry 205.

The power supply 300 receives power from the power source 160 and regulates the supply power to one or more desired voltages. In the illustrated construction, the power supply 300 includes a voltage regulator REG1, capacitors C1, C2, and C3, and diode D1, the combination of which result in a first supply voltage (e.g., 3.3 VDC) used to power a first set of components of the controller 150. The power supply 300 further includes Zener diodes ZD1 and ZD2 for protecting circuitry (e.g., the voltage regulator) of the controller 150 from voltage spikes. In one construction, the voltage regulator REG1 is a Rohm model number BA033CC0FP voltage regulator. Of course, other voltage regulators may be used for other constructions and the magnitudes of the supply voltages can vary.

The revolution detection circuit 310 is connected to the ignition circuit 165 and provides a revolution signal to the microcontroller M1 having a relation to the rotational movement of the engine 100. The microcontroller M1 receives the revolution signal and determines a revolution count and/or a rotational speed of the engine using the signal. For example, the revolution signal may be a train of pulses having a relation to a flywheel magnet interacting with an ignition coil or other coil. The microcontroller M1 can determine the revolution count by counting the accumulated pulses from a point in time or point in operation, and/or can determine the rotation speed based on the frequency of the pulses. In the illustrated construction, the revolution detection circuit 310 includes diode D4; transistor Q1; resistors R4, R5, R6, R7, and R8; and capacitors C6 and C7. The circuitry 310 filters and conditions the signal from the coil, and provides a pulse train to the microcontroller M1.

The temperature signal conditioning circuit 305A includes a resistor R10 and a capacitor C13, both of which are coupled to the temperature sensor 170A of FIG. 3. Alternative temperature sensors, such as a thermistor, can include a different conditioning circuit, such as temperature signal conditioning circuitry 305B. The temperature sensor conditioning circuit 305B includes resistors R1, R2, and R3; resistor array RB1; diodes D2 and D3; and capacitors C4 and C5. It is also envisioned for some constructions to include other temperature sensors for providing an ambient or comparison temperature. For example, a temperature sensor can be supported by or directly coupled to the circuit board 210.

The microcontroller M1, for the shown construction, is a NEC model no. UPD78F0500 microcontroller. The microcontroller M1 includes a processor, volatile memory, nonvolatile memory, an A/D converter, a counter or timer, an oscillator, and a communication port. It is envisioned that the microcontroller M1 may be divided into multiple microcontrollers, that some of the just-listed features of the microcontroller M1 may be separate or distinct from the microcontroller M1 (e.g., the inclusion of a separate oscillator from the microcontroller M1), and that the microcontroller M1 may include other features not listed. It is also envisioned that other hardware devices (e.g., other programmable devices and application specific integrated circuits) and arrangements may be used in place of the microcontroller M1.

In operation of the microcontroller M1, during Run Mode (discussed below), instructions (e.g., in the form of code) stored in memory 325 are executed by the processor 330 to receive signals from the revolution detection circuit 310 and the temperature sensor 170, to process the information contained in the signals, and to output signals for controlling the motor 145 based on the processed signals and other information (e.g., data) stored in the memory 325. In Program Mode (discussed below), instructions stored in the memory 325 are executed by the processor 330 to promote communication with an external device via the I/O circuit 205. It is also envisioned that the processor 330 can execute other instructions for promoting other operations not discussed herein.

Referring again to FIGS. 6A and 6B, the motor drive circuit 320 receives a control signal from the microcontroller M1 and translates the signal to a drive signal for controlling the motor 145. The type and arrangement of the signal may depend in part on the type of motor used. For example, the motor for one construction is the uni-polar stepper motor 145. The motor driver circuit 320 shown in FIG. 6B may be used with the uni-polar stepper motor 145. More specifically, the illustrated construction includes dual field effect transistors (FETs) F1 and F2; resistor arrays RB5 and RB6; and diodes D10, D11, D12, D13, and D14. It is also envisioned that the microcontroller M1 can modify the control of the motor 145 based on the battery voltage. That is, the microcontroller M1 can operate the motor 145 with a first technique if the battery voltage is low and operate the motor 145 with a second technique if the battery voltage is high.

Before proceeding further, it should be understood that the automatic choke 240 can include the mechanical stop 155 (FIG. 2) for preventing the choke valve from moving past a known or selected position. The mechanical stop 155 allows the motor 145 to step through a predetermined number of degrees of rotation (e.g., 360-degrees of rotation) at predefined times (e.g., upon power up) to guarantee that the valve is at a known location (e.g., fully-closed). Based on this initial position, the microcontroller M1 knows the location of the valve 115 as the motor 145 moves the valve 115 from the known location. In other constructions, the microcontroller M1 can receive a signal from a sensor coupled to the motor 145, the signal having a relation to the position of the valve 115. It is also envisioned that a second mechanical stop can be used with one stop 155 corresponding to a first position (e.g., fully closed) and a second stop corresponding to a second position (e.g., fully opened).

The I/O circuit 205A shown in FIG. 6A promotes serial communication with the microcontroller M1. The I/O circuit 205A includes a resistor array RB2, Zenor diodes ZD3, and capacitors C8 and C9. Of course, the I/O layer can use other wire and/or wireless interfaces for promoting communication with the microcontroller M1. For example, the construction shown in FIG. 4 also includes I/O circuit 205B. The I/O circuit 205B promotes communication through resistor arrays RB3 and RB4; resistor R9; and capacitors C10, C11, and C12. In one embodiment, the I/O circuit 205B is used for programming the microcontroller M1 during manufacturing or to re-load the entire program, and the I/O circuit 205A is primarily used for maintenance, including software maintenance.

For the construction shown, a technician or operator can electrically couple a device (such as a hand-held device, personal computer, or similar computing device) to the microcontroller M1 during the Program Mode. The Program Mode allows information to be exchanged with the microcontroller M1. The information exchange can include downloading configuration information (e.g., data, tables, equations, events) to the microcontroller M1; downloading programming information (e.g., instructions; code) to the microcontroller M1; and uploading event information (e.g., logs; faults; codes; data) from the microcontroller M1. It should be apparent that the program mode allows the operator to program the automatic choke to a specific apparatus 102.

As used herein, the term "configuration information" is broadly construed to comprise information used to configure the automatic choke to the engine and/or apparatus containing the automatic choke. It is envisioned that the configuration information can include information for multiple engines/apparatus and an operator can select the configuration information for the specific engine/apparatus containing the automatic choke.

The technician can also instruct the microcontroller M1 to operate in a Run Mode. The Run Mode allows the microcontroller M1 to control the motor 145 in response to the inputs (e.g., temperature and speed signals) received by the microcontroller M1. It is contemplated that the microcontroller M1 can receive embedded signals, via the I/O circuit, indicating the Program and Run Modes.

The controller 150 can include other output circuitry for providing signals to other devices. For example, the controller 150 in FIG. 6A includes an output circuit 205C having resistors R11, R12, R13, R14, R15, R16, R17, R18, and R19; FET F3; diodes D5, D6, D7, D8, and D9; and capacitor C14, the combination of which provides a first output to a light-emitting diode LED and a second output to a solenoid. The LED provides a visual output to the operator or technician regarding a state of the automatic choke. The solenoid can be used to shut off fuel flow to the engine.

Figure 7A:
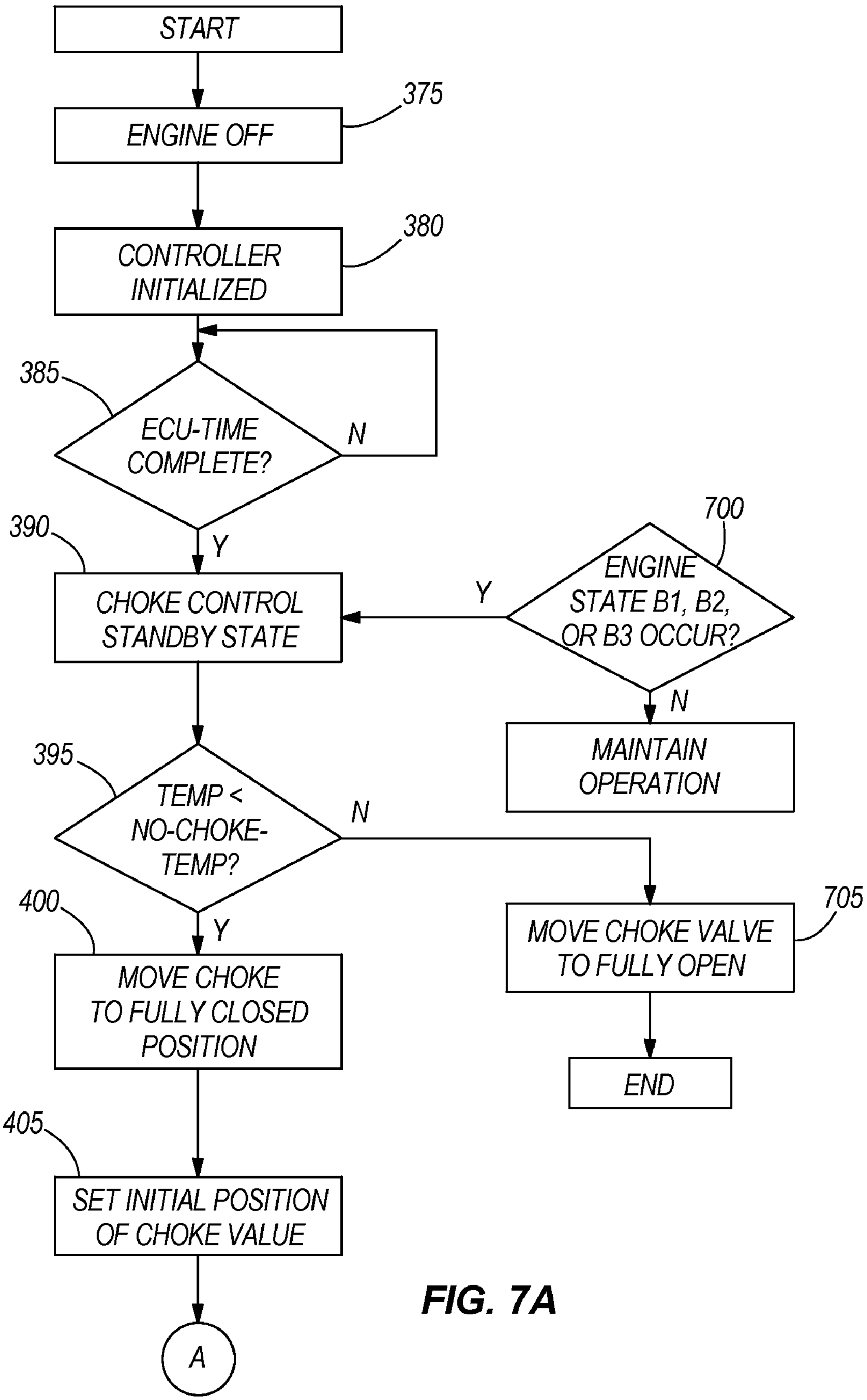
FIGS. 7A-7C are flow diagrams of a method of operating the automatic choke of FIG. 4.
Figure 7B:
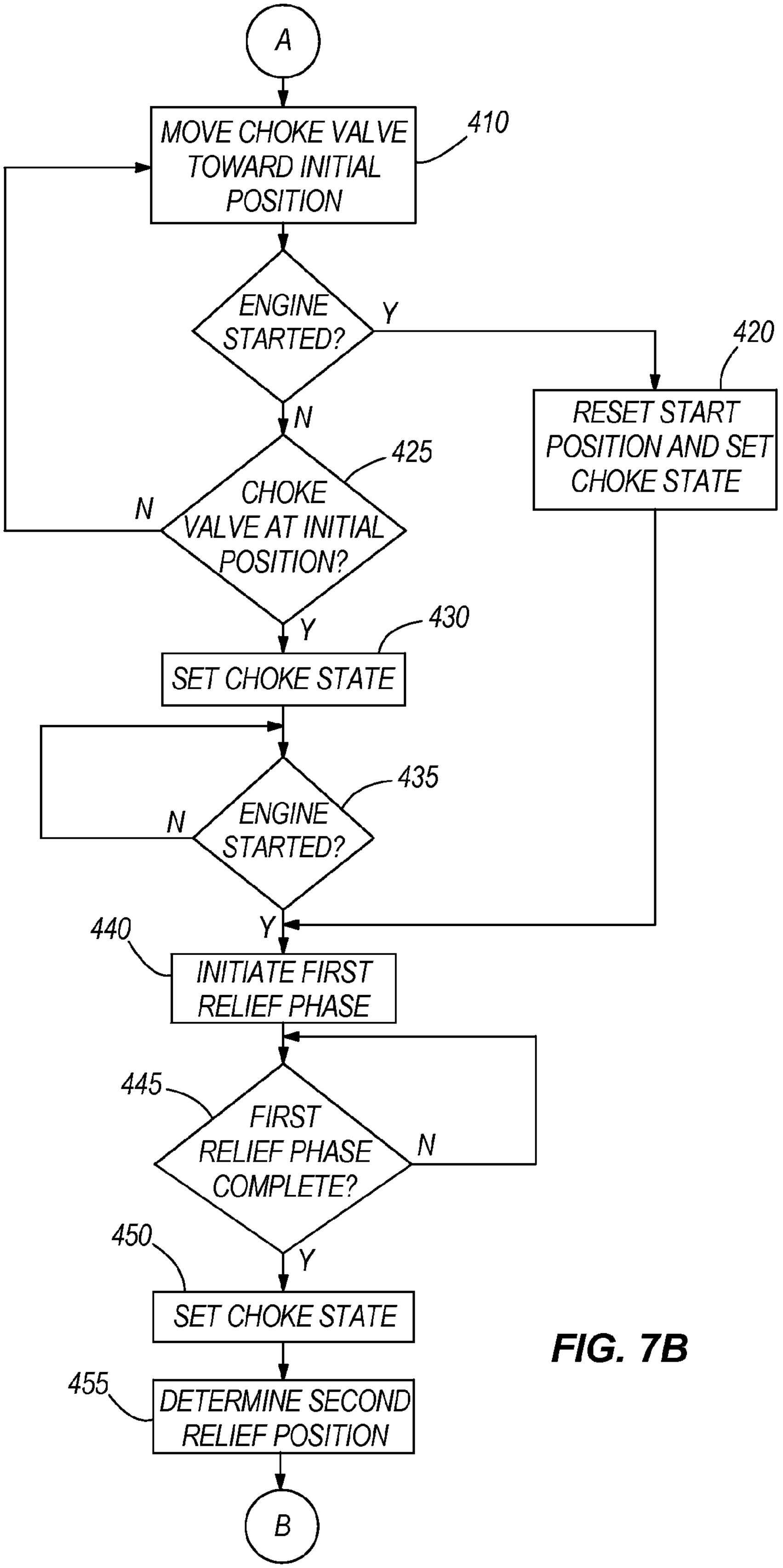
Figure 7C:
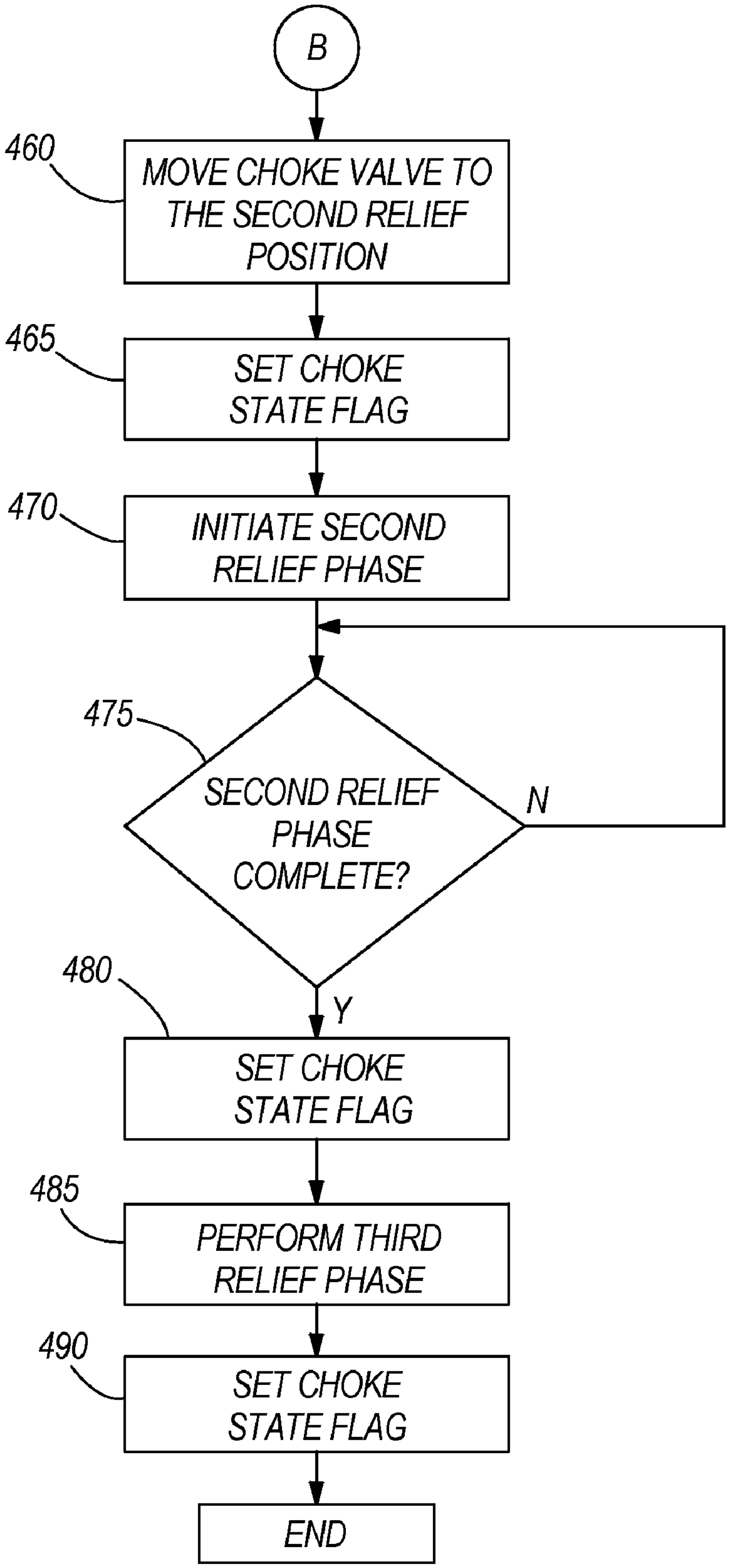
Figure 8:
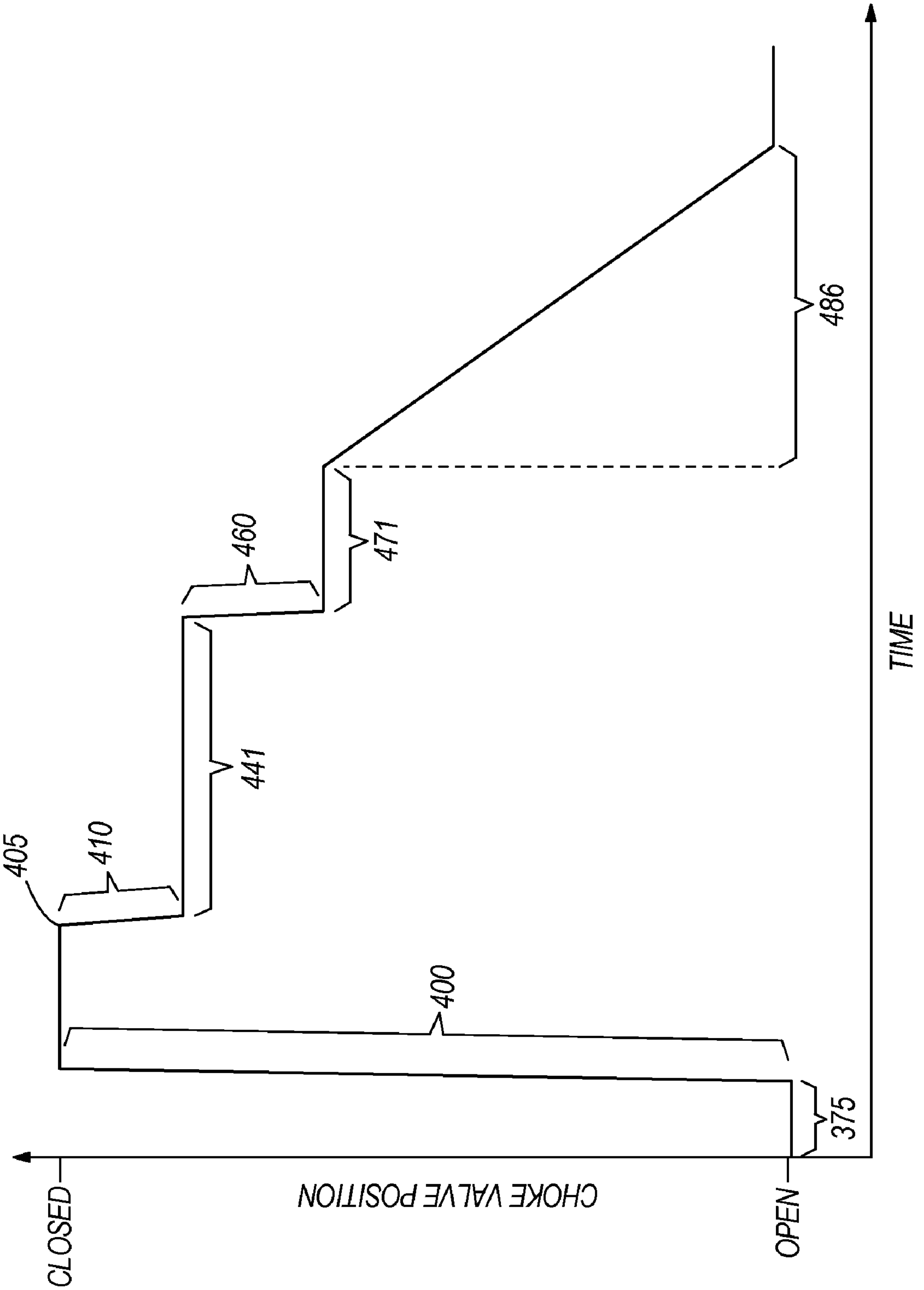
FIG. 8 is a graphical representation of the method of FIGS. 7A-7C.

One method of operating the automatic choke 240 is shown in FIG. 7, which consists of FIGS. 7A, 7B, and 7C. FIG. 8 is a graphical representation of the position of the choke valve 115 versus time during an exemplary method of operation. At step 375, the engine 100 is off and the controller 150 is powered down. Step 375 can occur when a key switch is turned to the "off" position. At step 380, the controller 150 is initialized. This can occur when an operator activates the apparatus 102 (e.g., turns a key to the "on" position), which results in the power source 160 supplying power to the power supply 300. The power supply 300 regulates the supply power and provides the power to the controller 150, including the microcontroller M1. Upon receiving the power, the microcontroller M1 is initialized, reads instructions and data from memory 325, and initiates the automatic choke 240. The microcontroller M1 also starts a counter ECU_TIME.

Upon the counter ECU_TIME (step 385) completing a time period, the microcontroller M1 proceeds to step 390, referred to herein as the Choke Control Standby State. While the description thus far discusses the method proceeding from step 385 to step 390, the microcontroller M1 enters the Choke Control Standby State (step 390) under other conditions, some of which are discussed below. Similarly, while the upcoming description discusses the operation proceeding from step 390 to step 395 to step 400, the operation can change the order of steps, as will be exampled below. Before proceeding further, it should be understood that the sequence of the steps discussed herein can vary, one or more steps may occur concurrently, and not all steps may be required.

Also, it should be understood that, when the microcontroller M1 performs an operation, the processor 330 obtains one more instructions from the memory 325, interprets the obtained instructions, and executes the interpreted instructions to perform the particular function. For example, if the microcontroller M1 determines an initial temperature, then the processor 330 obtains, interprets, and executes one or more software instructions to acquire and determine an initial temperature for the engine 100.

At step 395, the microcontroller M1 determines whether the ECU_TIME counter has passed the time period (e.g. four seconds) and a temperature parameter TEMP (discussed below) is less than a threshold NO_CHOKE_TEMP (discussed below). If both of these conditions are met, then the microcontroller M1 proceeds to step 400. If not, then the microcontroller proceeds to step 705 (discussed below). The microcontroller M1 proceeds to step 400 predominantly upon the key turning to the "on" position and the ECU_TIME counter lapsing.

At step 400, the microcontroller M1 issues a signal to the motor drive circuit 320 to drive the motor 145 to the fully-closed position. In one construction, the motor drive circuit 320 causes the motor 145 to rotate an excessive number of degrees to confirm the choke valve 115 is in the fully-closed position. After the motor has initialized (i.e., fully closes), then the microcontroller M1 sets the parameter MOTOR_POSITION (which identifies the location of the choke valve 115) to zero and a flag CHOKE_STATE_B0 to one.

Before proceeding further, it should be understood that a "fully-closed position" may not result in the choke valve 115 being completely closed (e.g., the valve 115 is 100% closed) and a "fully-open position" may not result in the choke valve 115 being completely open (e.g., the valve 115 is 100% open). However, the fully-closed position will be referred to herein as the furthest position the choke valve 115 can close and the fully-open position will be referred to herein as the furthest position the choke valve 115 can open.

At step 405, the microcontroller M1 determines an initial (or first relief) position of the choke valve 115. More specifically, the microcontroller M1 accesses the configuration information and obtains one or more data tables for the automatic choke 240. The microcontroller M1 then determines a present temperature, referred to herein as the initial temperature for the engine 100. For example, the microcontroller M1 can acquire a signal from the temperature sensor 170. With the initial temperature and the configuration information, the microcontroller M1 determines the initial position of the choke valve 115. For example, if the initial temperature is a cold, ambient temperature, then the initial position might be fully closed; if the initial temperature is a moderate, ambient temperature, then the initial position might be a partially closed position; and if the initial temperature is an above-ambient, hot temperature (e.g., resulting from a previous running of the engine), then the initial position may be at an almost fully-open position. For the example shown in FIG. 8, the initial position is not at the fully closed position.

In one exemplary operation, the microcontroller M1 accesses a data table for the initial position. One exemplary table is shown in Table 1. The table includes a plurality of discrete points defining a relationship among the present temperature and choke valve position (INITIAL_POS). The microcontroller M1 can include instructions for interpolating the acquired data to create values, for example, between the discrete points. In other constructions, the stored data can include data for defining equations or other relationships to establish a relationship among the initial choke position and the initial temperature.

TABLE 1

[t1]

| | Initial Temp. (Deg F.) | | | | | | |
|---|---|---|---|---|---|---|---|
| | −20 | −10 | 0 | 40 | 50 | 70 | 120 |
| Initial position (%) | 100 | 100 | 100 | 100 | 95 | 90 | 85 |

It should also be understood that the stored data can vary depending on many factors, such as the model of the engine, model of the original equipment including the engine, the attached accessories, expected environment, etc. The stored data can be created empirically and stored in the microcontroller.

During step 410, the microcontroller M1 moves the choke valve 115 toward the initial position. For example, the parameter MOTOR_TARGET_POS is set to the choke start position (INITIAL_POS) of Table T1. The choke valve 115 moves toward the MOTOR_TARGET_POS. If the engine 100 starts (discussed below—step 415) before movement is complete, then the choke start position (INITIAL_POS) is set as the present position of the choke valve 115 (step 420), a flag CHOKE_STATE_B1 is set to one, and the microcontroller M1 proceeds to the first relief phase. When the choke valve 115 obtains the choke start position (i.e., MOTOR_TARGET_ POS—step 425), then the flag CHOKE_STATE_B1 is set to one (step 430) and the microcontroller M1 proceeds to the first relief phase. It should be apparent that the MOTOR_TARGET_POS parameter relates to the position at which the choke valve 115 moves toward, and the MOTOR_POSITION parameter related to the position that the choke valve 115 is currently located. Further references to the parameter MOTOR_TARGET_POS and MOTOR_POSITION will not be provided below, but should be apparent from the description below.

It should be understood that the operator may be cranking the engine 100 before, during, or after step 430. For example, the operator can turn the key switch to a "start" position, which results in a start motor cranking the engine 100. The operator could have turned the key switch to the "start" position soon after turning the key switch to the "on" position or could have delayed between the movements. During cranking, the revolution detection circuit 310 provides a pulse train to the microcontroller M1. The microcontroller M1 senses the pulse train and determines the starter motor is cranking the engine 100 when the frequency of the pulse train is less than a defined frequency. If the engine does not start by a defined time period, the automatic choke can indicate an error through the LED and stop the start routine.

The microcontroller M1 will continue to monitor the engine speed to determine whether the engine 100 has started. Typically, the microcontroller M1 can determine the engine 100 has started by determining whether the rotational speed of the engine 100 is greater than a threshold, which is referred to as the start speed. For example, the start speed can be slightly greater than the maximum speed of the starter motor. Alternatively, a table can be created for the engine start decision based on the initial engine temperature.

At step 435, the microcontroller M1 detects whether the engine 100 has started. If yes, then the microcontroller M1 proceeds to step 440 to perform a first relief phase.

At step 440, the automatic choke 240 initiates a first relief phase, which is identified as line 441 in FIG. 8. For the first relief phase 441, the microcontroller M1 acquires a temperature (hereinafter the "engine-run temperature") after the starting of the engine. Alternatively, the microcontroller M1 might use the initial temperature as the engine-run temperature.

With the engine-run temperature and configuration information, the microcontroller determines a first relief period (e.g., a length of time or periodic count) of the first relief phase 425 (step 435). An exemplary table for the first relief phase 425 is shown in Table 2. The table includes a plurality of discrete points defining a relationship between the engine-run temperature and the first relief period. The microcontroller can include instructions for interpolating the acquired data to create values, for example, between the discrete points. In other constructions, the stored data can include data for defining equations or other relationships to establish a relationship between the engine-run temperature and the first relief period. A relief phase is defined herein as a phase in which the choke valve 115 provides a controlled choke relief to the engine 100; e.g., the choke valve 115 is kept or held at a position for a time period or count, or the choke valve 115 is controllably moved at a defined rate that provides a defined relief.

TABLE 2

[t2]

| | Engine-Run Temperature (Deg F.) | | | | | | |
|---|---|---|---|---|---|---|---|
| | −20 | −10 | 0 | 40 | 50 | 70 | 120 |
| First Relief Duration (Sec) | 6 | 4 | 2 | 0.5 | .3 | .1 | 0 |

At step 440, the microcontroller M1 maintains the choke valve 115 at the initial position INITIAL_POS until the period lapses for the first relief phase 441 (step 445). The period for the first relief phase 441 can be initiated from one of a plurality of points (e.g., when entering step 440 or entering step 405). Other time measurements can be used in place of seconds. For example, the time measurement can be a processor or oscillator count. After the first relief phase 441 ends, the flag Choke_State.B2 is set to one (step 450).

After the first relief phase, the microcontroller M1 determines a second position for the choke valve 115 (step 455), referred to as the second relief position. For the second relief position, the microcontroller M1 uses the engine-run temperature and configuration information for determining the second relief position.

An exemplary table for the second relief position is shown in Table 3. The table includes a plurality of discrete points defining a relationship between the engine-run temperature and the second relief position. The microcontroller M1 can include instructions for interpolating the acquired data to create values, for example, between the discrete points. In other constructions, the stored data can include data for defining equations or other relationships to establish a relationship between the run temperature and the second relief time or the second revolution count. It is also envisioned that the second relief position can be determined based on a current run temperature.

TABLE 3

[t3]

| | Engine-Run Temperature (Deg F.) | | | | | | |
|---|---|---|---|---|---|---|---|
| | −20 | −10 | 0 | 40 | 50 | 70 | 120 |
| Second Relief Position (%) | 70 | 70 | 65 | 60 | 60 | 55 | 50 |

The microcontroller then moves the choke valve to the second relief position. At step 460, the choke valve 115 is driven to the second relief position. After completing the movement, the flag CHOKE_STATE_B3 is set to one (step 465).

At step 470, the automatic choke 240 initiates a second relief phase. For the second relief phase 471 (FIG. 8), the microcontroller M1 uses the engine-run temperature and configuration information for determining an engine revolution count. The engine revolution count for the second relief phase 471 can be initiated from the movement of the choke valve to the second relief position. However, in other embodiments, the engine revolution count can begin from the end of the first relief phase 441.

An exemplary table for the second relief phase 471 is shown in Table 4. The table includes a plurality of discrete points defining a relationship between the engine-run temperature and the second revolution count. The microcontroller M1 can include instructions for interpolating the acquired data to create values, for example, between the discrete points. In other constructions, the stored data can include data for defining equations or other relationships to establish a relationship between the run temperature and the second revolution count. It is also envisioned that the second relief position and the second revolution count can be determined based on a current run temperature.

TABLE 4

[t4]

| | Engine-Run Temperature (Deg F.) | | | | | | |
|---|---|---|---|---|---|---|---|
| | −20 | −10 | 0 | 40 | 50 | 70 | 120 |
| Second Relief Count (Rotational pulses) | 3500 | 2500 | 1500 | 1000 | 500 | 200 | 0 |

The microcontroller M1 maintains the choke valve at the second relief position until the monitored revolution count traverses the second relief count (step 475). The period for the second relief phase 471 can be initiated from one of a plurality of points (e.g., the end of the first phase or after movement of the choke valve to the second relief position). Upon completion of the run relief position, the flag CHOKE_STATE_B4 is set to one (step 480).

The automatic choke 240 then performs a third relief phase (step 485), which is identified as line 486 in FIGS. 6A and 6B. For the third relief phase 486, the microcontroller M1 uses the engine-run temperature and configuration information for determining the parameters of the third relief phase 486. In one operation, the parameters of the third relief phase 486 include a third relief period.

An exemplary table for the third relief phase 486 is shown in Table 5. The table includes a plurality of discrete points defining a relationship between the engine-run temperature and the third relief period. The microcontroller M1 can include instructions for interpolating the acquired data to create values, for example, between the discrete points. In other constructions, the stored data can include data for defining equations or other relationships to establish a relationship between the run temperature and an engine revolution count. It is also envisioned that the third relief period can be determined based on a current run temperature.

TABLE 5

[t5]

| | Engine-Run Temperature (Deg F.) | | | | | | |
|---|---|---|---|---|---|---|---|
| | −20 | −10 | 0 | 40 | 50 | 70 | 120 |
| Third Relief Duration (Sec) | 4 | 4 | 3 | 2 | 1 | 0 | 0 |

In the exemplary operation, the automatic choke 240 moves the choke valve 115 over the duration of the third relief phase 486. This movement may also be referred to as a controlled movement. For example, the microcontroller M1 determines the remaining angular movement for the valve 115 to fully open. The microcontroller M1 then divides the third relief period proportionally over the remaining angular movement. For example, if the choke valve 115 is moved in one degree increments, if the second relief position is 45 degrees (50%), and the third relief period is 1.5 seconds, then the microcontroller M1 drives the valve one degree every 0.033 seconds (i.e., 1.5 seconds divided by 45 degrees). A controlled release can be similarly performed if the release is based on revolution count instead of time.

At step 490, the microcontroller M1 then determines that the third relief phase 486 is complete and sets the flag CHOKE_STATE_B5 equal to one. Once the choke valve 115 obtains the fully-open position, the parameter MOTOR_TARGET_POS is set as full open position, the present position parameter MOTOR_POSITION is set as full open position. The microcontroller maintains the choke valve at these positions until the engine shuts down or the detection of a safety switch. The sensing of whether the engine 100 shuts down can be based on engine rotational speed. For example, if the rotational speed is less than a minimum value for a time period, then the microcontroller M1 assumes the engine 100 has shut down and returns to step 375.

Figure 9:
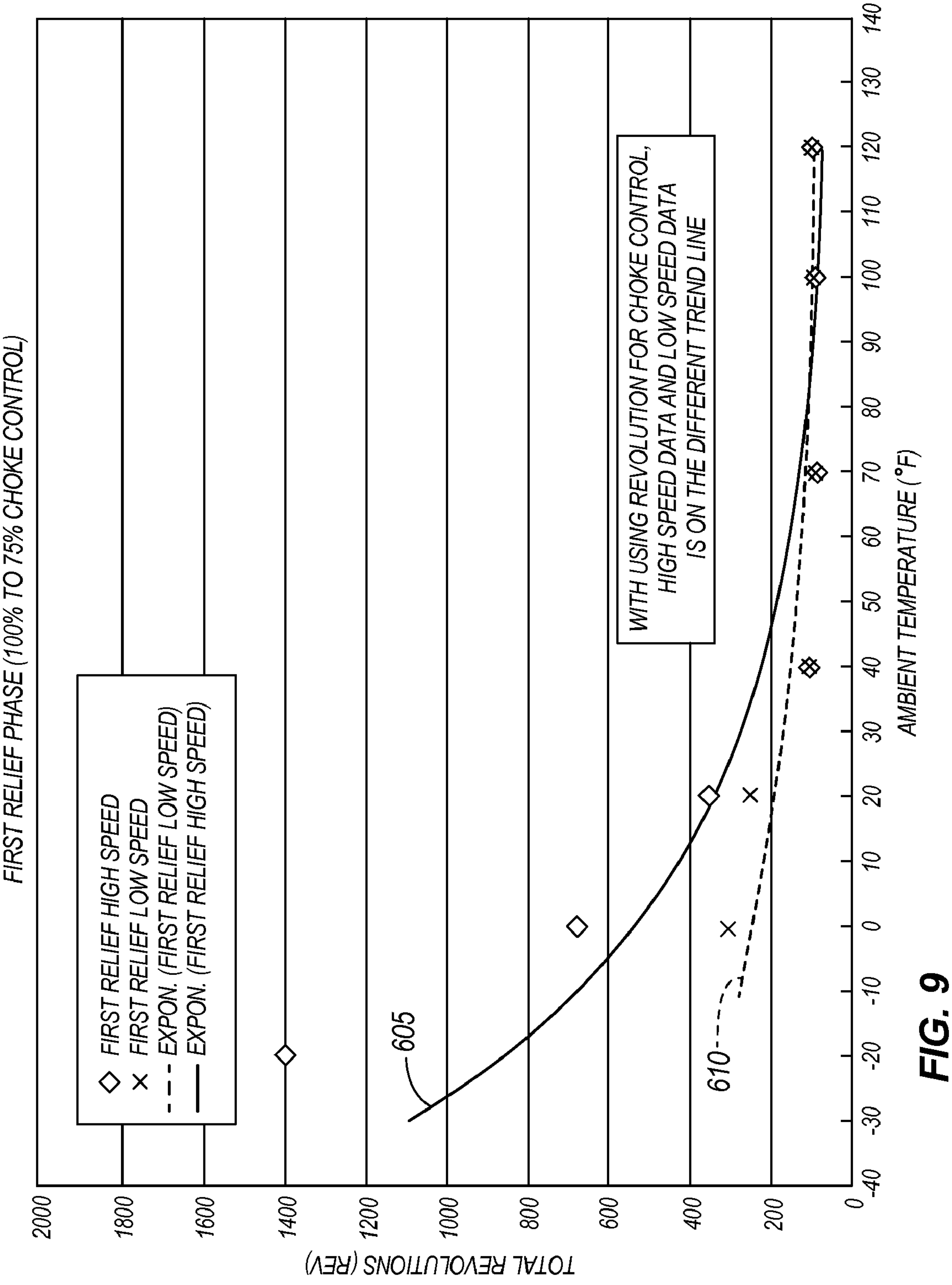
FIG. 9 is a graph representing the optimal number of revolutions versus ambient temperature for a motor in a first relief phase.
Figure 10:
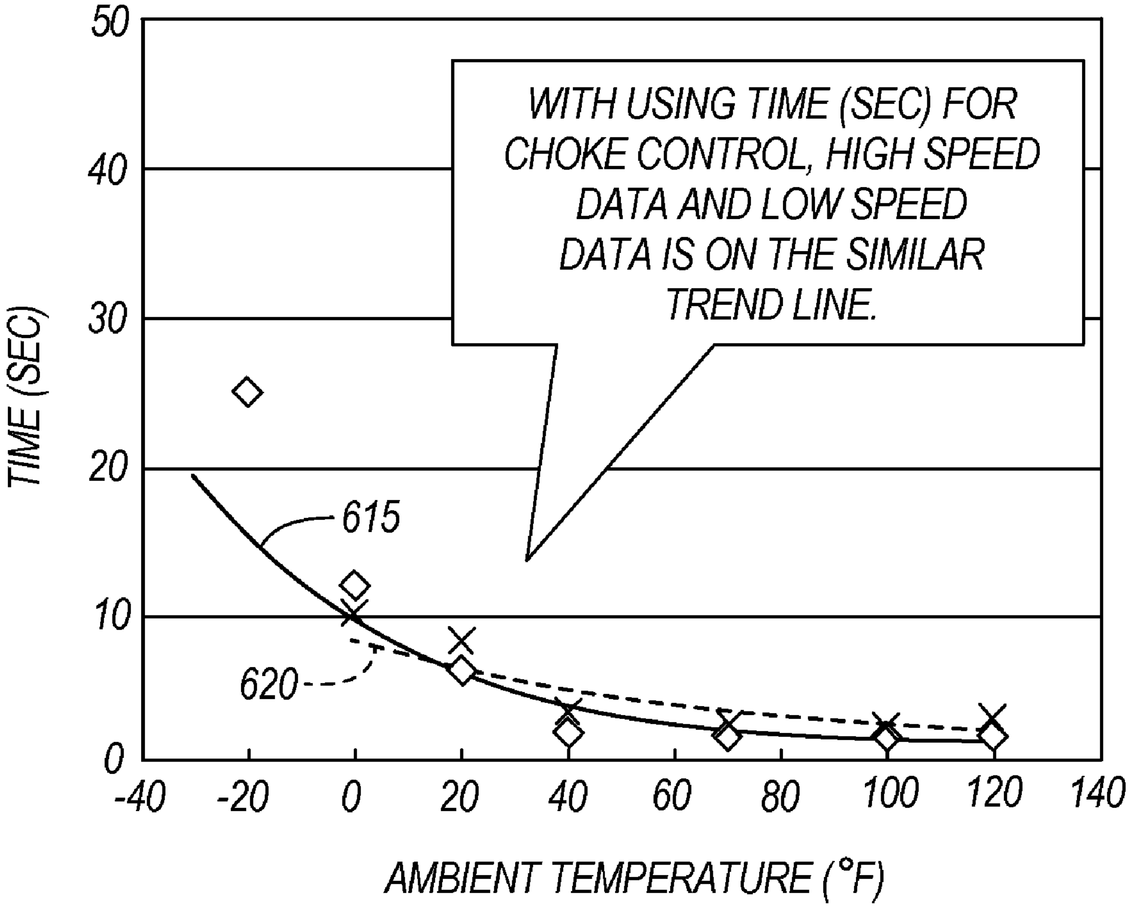
FIG. 10 is a graph representing the optimal time period versus ambient temperature for the motor in the first relief phase.
Figure 11:
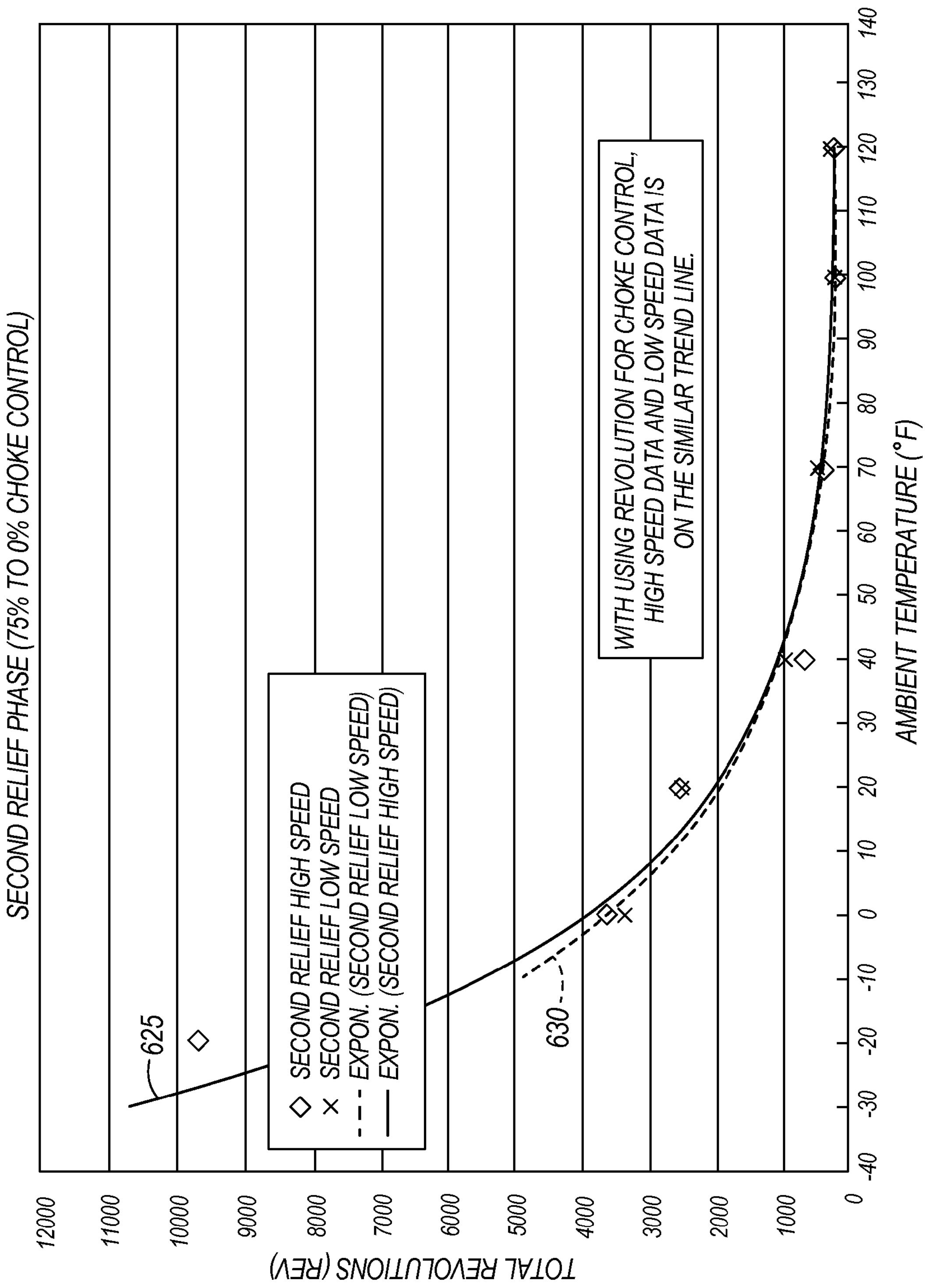
FIG. 11 is a graph representing optimal number of revolutions versus ambient temperature for a motor in a second relief phase.
Figure 12:
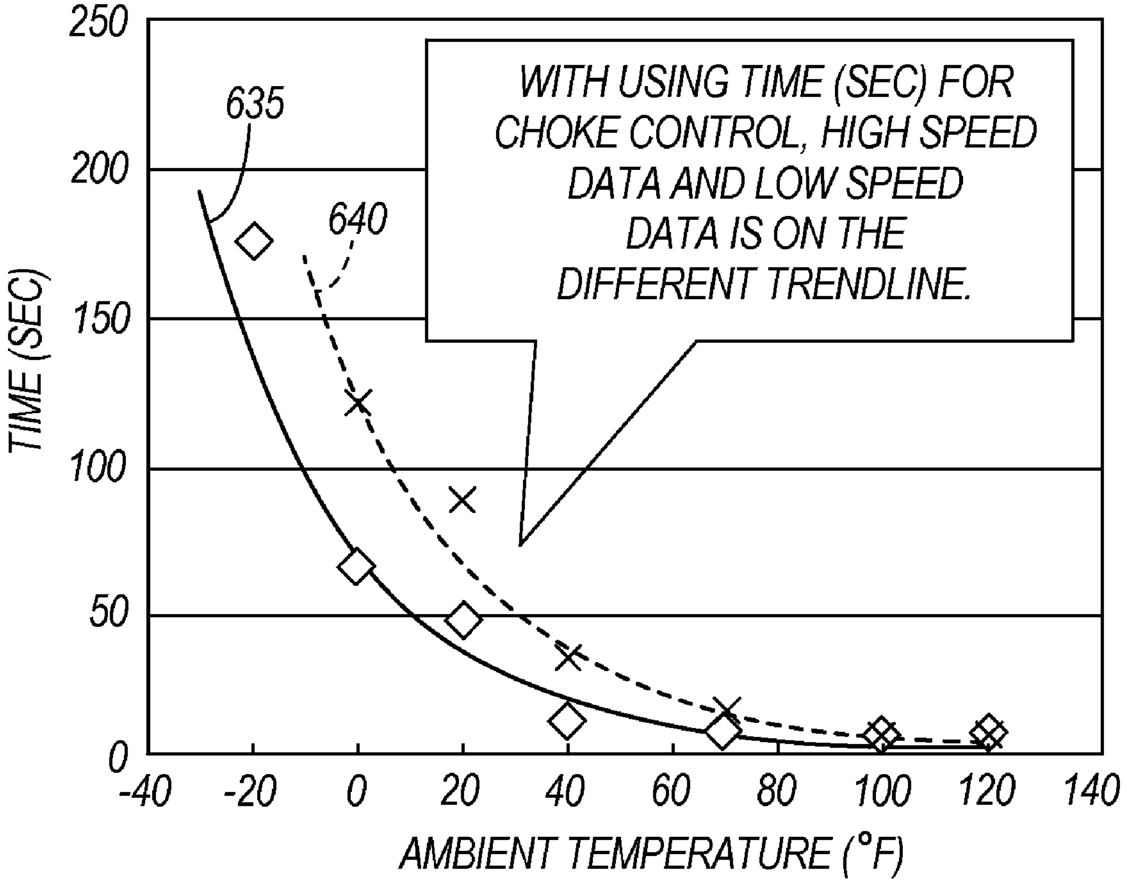
FIG. 12 is a graph representing the optimal time period versus ambient temperature for the motor in the second relief phase.

As discussed above, the automatic choke 240 includes multiple phases for controlling the position of the choke valve 115. In one construction, the length of the first relief phase 441 is based on time, and the length of the second relief phase 471 is based on revolution count. FIGS. 9, 10, 11, and 12 provide empirical test data for an engine 100 run at multiple engine speeds. The data includes optimal points for the engine 100 to transition from a first valve position to a second valve position (shown in FIGS. 9 and 10) at multiple temperatures, and optimal points for the motor to transition from the second valve position to the third valve position (shown in FIGS. 11 and 12) at multiple temperatures. As shown in FIGS. 9 and 10, time provides more consistent trending over multiple engine speeds between the first valve position and the second valve position than revolution count. That is, the trend lines 615 and 620 for high and low engine speeds, respectively, are more similar to each other than the trend lines 605 and 610 for high and low engine speeds, respectively. As shown in FIGS. 11 and 12, revolution count provides more consistent trending for multiple engine speeds between approximately 75% and 0% than does time. That is, the trend lines 625 and 630 for high and low engine speeds, respectively, are more similar to each other than the trend lines 635 and 640 for high and low engine speeds. Therefore, for the motor tested in FIGS. 9, 10, 11, and 12, time is a better control parameter for the first phase and revolution count is a better control parameter for the second phase.

As discussed for the detailed example of FIG. 7, the microcontroller M1 further includes nonvolatile memory that stores choke operation information (e.g., a latest choke valve position, a latest "flag" of the algorithm). As the process traverses particular operations, the nonvolatile memory stores operation information, such as the flag. If the engine 100 stops or deactivates before completing the movement of the choke valve 115, the microcontroller M1 can retrieve the previously stored operation information and control the automatic choke 240 based on the stored operation information and based on other conditions. This allows the automatic choke 240 to reduce the time to perform the startup routine, and reduce the amount of exhaust caused by an overly-enriched fuel mixture.

In another construction, the microcontroller M1 determines whether the engine rotational speed signal (e.g., based on the ignition signal) was removed (or "cut") as a result of engine overload. For example, if the rotational speed signal goes slower (e.g., the microcontroller M1 detects a slower speed, such as cranking speed) and then the signal is suspended, the microcontroller M1 then determines that the engine 100 stalled by overload. If the engine 100 stops as a result of overload during cranking RPM (e.g., prior to the engine-start speed), then the microcontroller M1 can re-initiate the control sequence. Alternatively, if the engine 100 stops as a result of overload after cranking RPM (e.g., after the engine-start speed), then the microcontroller M1 can adjust the starting sequence using the previously stored flag information, or the microcontroller M1 can re-initiate the control sequence.

In yet another construction, the microcontroller M1 determines whether the rotational speed signal was removed or interrupted as a result of a safety switch, such as a seat switch, being activated. For example, if the engine rotational speed signal is suspended without detecting a slower speed, such as the cranking speed, then the microcontroller M1 determines that the rotational speed signal was interrupted by a safety switch. That is, the safety switch initially causes the removal and the later return of the ignition signal, thereby restarting the engine without any cranking. If the ignition signal was removed as a result of a safety switch, the microcontroller M1 waits or holds for a time period (e.g., 5 seconds), and then determines the rotational speed of the engine 100. The microcontroller M1 can modify the operation of the automatic choke based on the returning rotational speed. The microcontroller M1 can use the previously stored flag information to adjust the starting sequence. If the microcontroller M1 does not use previously-stored flag information, then one or more phases of the control sequence can be skipped. Alternatively, if the rotational speed is less than the threshold, then the microcontroller M1 can re-initiate the control sequence (e.g., return to the initial position).

In a further construction, the microcontroller M1 determines whether the power was removed as a result of a safety switch being activated. If the power signal was removed as a result of a safety switch, which can be determined if the ignition signal returns at power-up, the microcontroller M1 waits a time period (e.g., 5 seconds), and then determines the rotational speed of the engine 100. The microcontroller M1 can modify the operation of the automatic choke based on the rotational speed. For example, if the rotational speed is greater than a threshold (e.g., the engine-start speed), then the microcontroller M1 uses the previously stored flag information to adjust the starting sequence. If the microcontroller M1 does not use previously-stored flag information, then one or more phases of the control sequence can be skipped. Alternatively, if the rotational speed is less than the threshold, then the microcontroller M1 can re-initiate the control sequence (e.g., return to the initial position).

In some constructions, the engine rotational speed may be faster than the engine-start speed, or the cranking speed, before the automatic choke 240 finishes initializing. It is envisioned that the microcontroller M1 can recognize this situation, move the choke valve 115 to a position between fully open and fully closed, and start the process from that position. The rotational travel of the choke valve 115 can be the same as or larger than the full travel to obtain the fully open position since the choke valve 115 started from the modified initial position. It is also envisioned that the control sequence can skip one or more phases. For example, the control sequence may start from step 455 with the assumption that the first relief phase is unnecessary.

In another construction, the automatic choke 240 includes a sensor for sensing a parameter having a relation to the load on the engine. For example, the sensor can be a load-MAP (manifold air pressure) sensor. In other constructions, the sensor can be the revolution sensor, where the microcontroller determines a rotational speed. The rotational speed, in some apparatus 102, can have a relation to the load of the apparatus. The load sensor can be used to adjust the valve position if the automatic choke 240 senses a change in the load. For example, if the load is increased while the automatic choke 240 is in the process of the choke routine, the air-fuel mixture may be too rich, or too far from the desired air/fuel ratio, for the additional load. The automatic choke 240 can adjust the valve position to provide a richer mixture to compensate for the additional load.

In yet another construction, the automatic choke 240 includes a second temperature sensor to be used for comparison with the sensor 170. For example, the second sensor can be coupled to the printed circuit board (PCB) for sensing a temperature of the PCB. Since the PCB is made from a different material than the engine housing, to which the sensor 170 can be directly coupled a temperature differential may occur depending on whether the engine has been recently started. The microcontroller M1 can use this information to adjust the starting sequence.

For example, if the temperature differential between the first and second temperature sensors is greater than a threshold (e.g., for example two degrees Fahrenheit), then the microcontroller M1 uses the previously stored flag information to adjust the starting sequence. Alternatively, if the two temperatures are substantially similar, then the microcontroller M1 might assume that the engine has been dormant and starts at step 375.

A more specific example regarding the adjustment of the control sequence of FIG. 7 is now provided. When the engine 100 stops for a time period, then the flag ENGINE_STATE_B1 is set to one. When the engine stalls due to excess load, then the flag ENGINE_STATE_B2 is set to one. When the engine stops due to a safety switch, then the flag ENGINE_STATE_B3 is set to one. These engine states can occur at almost any operation in the sequence of FIG. 7. As best shown by step 700, the sequence returns to step 390 when one of the flags ENGINE_STATE_B1, B2, or B3 occur. After step 395 but before step 400 (not shown), the microcontroller M1 can determine whether to proceed to a different point in the process (other than 405) based on the flags ENGINE_STATE_B1 through B3 and the flags CHOKE_STATE_B0 through B6. For a specific example, if the flag ENGINE_STATE_B3 is equal to one and the flag CHOKE_STATE_B3 is one, but the flag CHOKE_STATE_B4 is zero, then the microcontroller M1 can proceed to step 475. That is, the microcontroller M1 uses stored flags and status information to adjust the control of the automatic choke 240. Other examples using the ENGINE_STATE flags and the CHOKE_STATE flags can be accomplished similarly.

Referring again to step 395, the microcontroller M1 determines whether an engine temperature, which can be a current temperature or a previously stored temperature, is less than a threshold NO_CHOKE_TEMP. The threshold NO_CHOKE_ TEMP provides an indication of whether the engine temperature is sufficient such that no choke is required. For example, the engine may have been just running. If the process proceeds from step 395 to step 705, then the microcontroller M1 proceeds to move the choke valve 115 to the fully open position. Once the choke valve is fully open, the microprocessor proceeds to step 500.

In another exemplary method of operation, the microcontroller M1 compares the engine temperature to the circuit board temperature when the microcontroller M1 confirms that the actual engine RPM is above the start speed. If the difference between the two temperatures is greater than a threshold, then the microcontroller M1 can vary a parameter of at least one of the relief phases. For example, the microcontroller M1 can determine a ratio based on the temperature difference. The ratio can then be applied to the first relief time, the second relief count, and/or the third relief time. The use of the ratio can be in addition to adjusting the startup sequence based on the latest flag information.

In yet another additional construction (FIG. 13), the engine 100 includes a manual choke 800 that overrides the automatic choke 240. The engine 100 includes a choke lever 805, a choke link 810, and a motor lever 815 that couple the motor 145 to the choke valve 115. A manual operation lever 820 can be coupled to the motor lever 815. When moved by an operator, the manual operation lever 820 can override the automatic choke 240. This allows manual operation of the choke valve 115 when the automatic choke 240 is not performing to the satisfaction of the operator.

Figure 13:
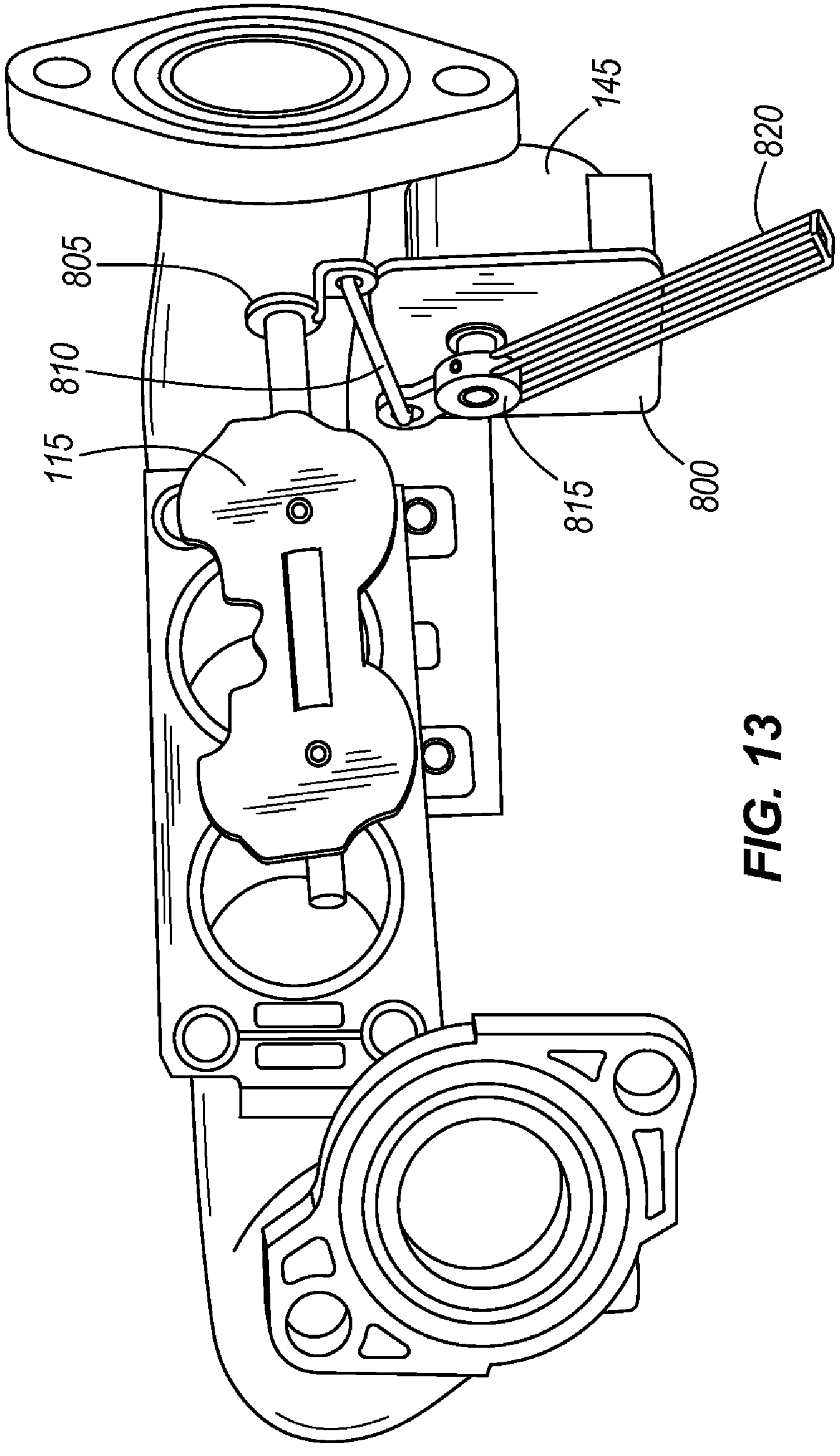
FIG. 13 is a partial-sectional view of an operator override of the automatic choke of FIG. 1.

In the more specific construction of FIG. 13, a mechanical clutch is coupled to or integrated with the motor 145. The mechanical clutch can be integrated with a motor gearing that couples a rotor shaft (discussed below) to the motor lever 815. The clutch slips when an operator moves the operation lever 820, even if the motor 115 is energized. This allows an operator to move the choke valve 115 regardless of the operation of the motor 145. This construction also allows control of the choke valve 115 even if the motor 145 does not operate.

Figure 14:
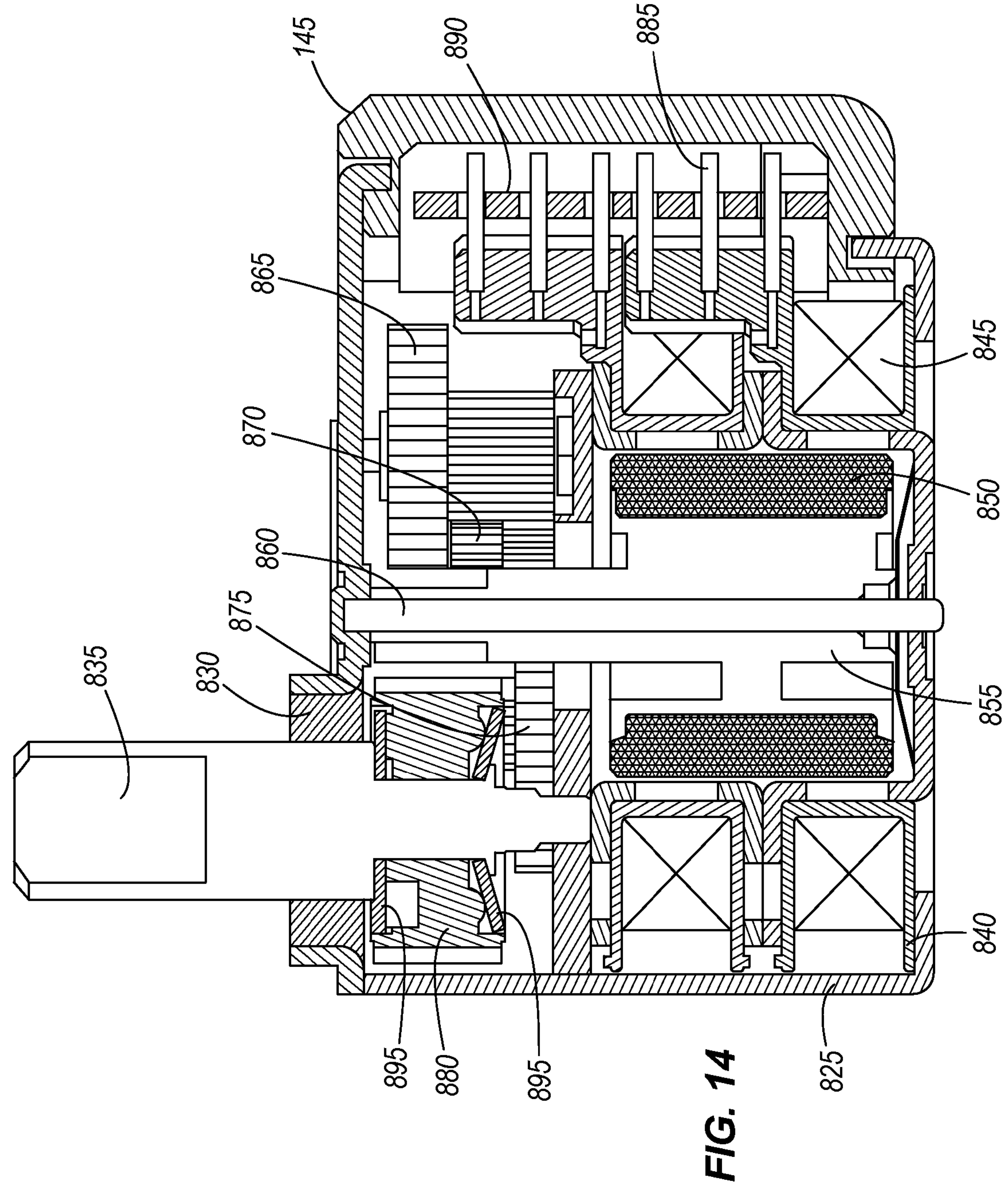
FIG. 14 is a sectional view of a motor capable of being used in the automatic choke represented in FIG. 13.

One exemplary motor 145 including a clutch is shown in FIG. 14. The motor 145 includes a housing 825 that supports a bushing 830. An output shaft 835 rotates in the bushing 830 and couples to the motor lever 815. Enclosed within the housing is a stator 840 having windings 845. The windings 845 controllably generate a magnetic field that interacts with a magnetic field of the rotor 855 (e.g., a magnetic field produced by magnets 850 of the rotor 855). The rotor 855 is interconnected with (e.g., coupled to or integrated with) a rotor shaft 860 supported by one or more bearings. The rotor shaft 860 is coupled to the output shaft 835 via gears 865, 870, 875, and 880. In general, the gears 865, 870, 875, and 880 cause the output shaft 835 to rotate in response to the rotor shaft 860. Pins 885 support a circuit board 890 having a motor controller attached thereto. The motor controller provides the voltage (or current) to the stator windings 545 to achieve the varying magnetic field. The motor 145 further includes clutch washers 895. Clutch washers 895 provide a friction fit between the output gear 880 and the output shaft 835 such that, when an excessive load is applied to the shaft 835, the shaft 835 slips with respect to the clutch washers 895. That is, under normal operation, the friction fit of the clutch washers 895 allows the motor 145 to control the choke valve 115 as described above. However, when an operator operates the manual operation lever 820, the shaft 835 slips regardless of the movement of the rotor shaft 860.

Therefore, the invention proves a new and useful engine with an automatic choke. The invention also provides a new and useful method of operating an automatic choke for an engine.

What is claimed is:

1. An engine having an ignition system that generates an ignition signal, a piston, a rotating shaft that rotates in response to movement of the piston, and an automatic choke, the automatic choke comprising:
- a choke valve movable between a fully closed position and a fully open position;
- a temperature sensor configured to provide a temperature signal related to a temperature of the engine;
- a motor configured to be connected to the choke valve and to move the choke valve in response to a motor control signal;
- a controller electrically connected to the motor and to the temperature sensor, the controller including an electronic circuit having a memory, the controller being configured to
  - generate the motor control signal to move the choke valve to a first position between the fully closed position and the fully open position,
  - store position information related to the first position,
  - store a flag associated with the first position,
  - determine that the engine has stopped,
  - determine that the engine has re-started,
  - control the choke valve using the stored position information based on the flag and the determination that the engine has re-started.

2. An engine as set forth in claim 1, and wherein the controller is configured to generate the motor control signal based on the temperature signal.

3. An engine as forth in claim 2, wherein the controller is configured to also generate the motor control signal based on the ignition signal.

4. An engine as set forth in claim 2, wherein the engine further includes an engine revolution detection circuit configured to provide an engine revolution signal having a relation to the rotation of the rotating shaft, and wherein the controller is configured to also generate the motor control signal based on the engine revolution signal.

5. An engine as set forth in claim 1, wherein the controller is further configured to determine a time period to hold the choke valve at the first position, the determination of the time period being based on a temperature value, the temperature value having a relation to the temperature signal, and to keep the choke valve at the first position for the time period, thereby providing choke relief to the engine.

6. An engine as set forth in claim 1, wherein the controller is further configured to determine a count to hold the choke valve at the first position, the determination of the count being based on a temperature value, the temperature value having a relation to the temperature signal, and to keep the choke valve at the first position for the duration of the count, thereby providing choke relief to the engine.

7. An engine as set forth in claim 1, wherein the engine includes a safety switch that stops the engine, and wherein the controller is configured to determine that the engine has stopped based on the safety switch.

8. An engine as set forth in claim 1, wherein the engine includes an overload switch that stops the engine, and wherein the controller determines the engine has stopped based on the overload switch.

9. An engine as set forth in claim 1, wherein the controller is configured to control the choke valve using the stored position information and the determination that the engine has re-started by being further configured to reinitiate control of the choke valve when the controller determines the engine has stopped based on at least one of a safety switch and an overload switch.

* * * * *